(12) United States Patent
Reese et al.

(10) Patent No.: US 9,749,887 B2
(45) Date of Patent: Aug. 29, 2017

(54) METHODS, APPARATUS AND ARTICLES OF MANUFACTURE TO TEST HOME NETWORKS

(71) Applicant: AT&T Intellectual Property I, L.P., Atlanta, GA (US)

(72) Inventors: Kevin Reese, Fayetteville, GA (US); Alfonso Jones, Suwanee, GA (US); Steven McDonald, Locust Grove, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/790,758

(22) Filed: Jul. 2, 2015

(65) Prior Publication Data
US 2015/0382219 A1 Dec. 31, 2015

Related U.S. Application Data

(63) Continuation of application No. 12/959,813, filed on Dec. 3, 2010, now abandoned.

(51) Int. Cl.
*H04W 24/08* (2009.01)
*H04L 12/26* (2006.01)

(52) U.S. Cl.
CPC .......... *H04W 24/08* (2013.01); *H04L 43/045* (2013.01); *H04L 43/0817* (2013.01); *H04L 43/12* (2013.01); *H04L 43/18* (2013.01); *H04L 43/50* (2013.01)

(58) Field of Classification Search
CPC ........ H04W 24/00–24/08; H04L 43/50; H04L 43/08–43/0894; H04L 43/045; H04L 43/18; H04L 43/12
See application file for complete search history.

(56) References Cited

U.S. PATENT DOCUMENTS

| | | | |
|---|---|---|---|
| 2005/0232159 A1 | 10/2005 | Joo et al. | |
| 2007/0192477 A1 | 8/2007 | Hicks, III et al. | |
| 2009/0073886 A1 | 3/2009 | Burns et al. | |
| 2009/0080349 A1 | 3/2009 | Rofougaran | |

(Continued)

OTHER PUBLICATIONS

EXFO, "HPNA Test Probe, ARU-100," Apr. 2009. (4 pages).

(Continued)

*Primary Examiner* — Eric Myers
(74) *Attorney, Agent, or Firm* — Hanley, Flight & Zimmerman, LLC

(57) ABSTRACT

Example methods, apparatus and articles of manufacture to test home networks are disclosed. A disclosed example method includes instructing, from a test controller, a test server to become communicatively coupled to a residential gateway of a home network. The test server is separate from the residential gateway. The test controller is separate from the residential gateway. The test controller instructs the test server to perform a first test of the home network. A second test of a femtocell is performed with a cellular transceiver of the test controller. The second test is different from the first test. The femtocell is communicatively coupled to the residential gateway. The femtocell is separate from the residential gateway. A first result of the first test and a second result of the second test are presented via a display of the test controller.

19 Claims, 26 Drawing Sheets

(56) References Cited

U.S. PATENT DOCUMENTS

| | | | |
|---|---|---|---|
| 2009/0082010 A1* | 3/2009 | Lee | H04W 88/08 455/424 |
| 2009/0135732 A1 | 5/2009 | Maxson | |
| 2009/0232008 A1 | 9/2009 | Wurst et al. | |
| 2010/0322085 A1 | 12/2010 | Kalbag | |
| 2011/0002325 A1* | 1/2011 | Jin | H04L 12/66 370/352 |
| 2012/0140641 A1 | 6/2012 | Reese et al. | |

OTHER PUBLICATIONS

EXFO, "IP Triple-Play Test Set, AXS-200/650," Jul. 2010. (8 pages).

Sunrise Telecom, "HTT-Home Test Toolkit," Data Sheet, Aug. 20, 2009. (2 pages).

JDS Uniphase "SmartClass Home HPNA, Inside Wiring and Networks Service Meter," Feb. 2009. (8 pages).

EXFO, "Triple-Play Assessment with a Higher IQ," Jun. 2009. (1 page).

Chambers, David; "Femtocell Testing Needs"; Published on Thursday, Jul. 10, 2008; Retrieved from "http://www.thinksmallcell.com/Opinion/femtocells-have-different-system-testing-and-tuning-needs.html" (3 pages).

United States Patent and Trademark Office, "Non-Final Office Action", issued in connection with U.S. Appl. No. 12/959,813, dated Dec. 26, 2012 (18 pages).

United States Patent and Trademark Office, "Final Office Action", issued in connection with U.S. Appl. No. 12/959,813, dated Jun. 10, 2013 (25 pages).

United States Patent and Trademark Office, "Non-Final Office Action", issued in connection with U.S. Appl. No. 12/959,813, dated Dec. 31, 2013 (28 pages).

United States Patent and Trademark Office, "Final Office Action", issued in connection with U.S. Appl. No. 12/959,813, dated Mar. 6, 2015 (15 pages).

* cited by examiner

METHODS, APPARATUS AND ARTICLES OF MANUFACTURE TO TEST HOME NETWORKS

RELATED APPLICATION

This patent arises from a continuation of U.S. patent application Ser. No. 12/959,813, which was filed on Dec. 3, 2010. U.S. patent application Ser. No. 12/959,813 is hereby incorporated herein by reference in its entirety.

FIELD OF THE DISCLOSURE

This disclosure relates generally to home networks and, more particularly, to methods, apparatus and articles of manufacture to test home networks.

BACKGROUND

Emerging home networks include multiple communication technologies interacting to provide services such as Internet protocol television (IPTV), voice over Internet protocol (VoIP), wireless local area network (WLAN) connectivity and/or home phoneline networking alliance (HPNA) connectivity. In a home network, a residential gateway communicatively couples devices of the home network (e.g., computers, set-top boxes, etc.) to an external network via a twisted-pair copper cable, a coaxial cable, and/or a satellite link.

DETAILED DESCRIPTION

Figure 1:
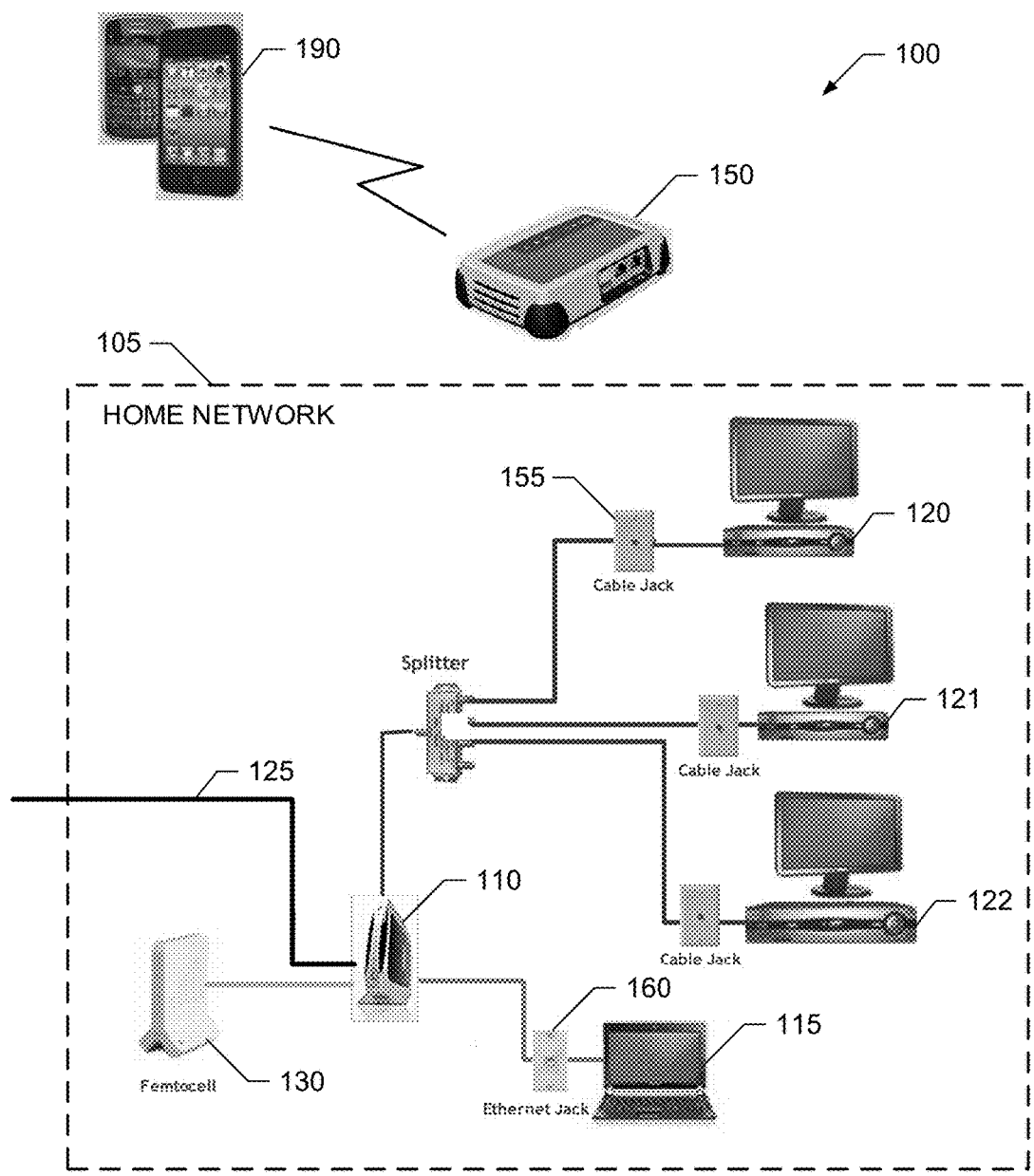
FIG. 1 is an illustration of an example home network test system implemented in accordance with the teachings of this disclosure.

Example methods, apparatus and articles of manufacture to test home networks are disclosed. A disclosed example method includes receiving a command from a wirelessly coupled test controller, communicative coupling a communication module to a home network in response to the command, performing a test of the home network via the communication module, and returning a result of the test to the test controller via a wireless signal.

A disclosed example home network test server includes a wireless communication interface, a second communication interface, and a communication module. The wireless communication interface to receive a command from a test controller via a first wireless signal. The second communication interface to establish a communicative coupling of the home network test server to a home network in response to the command. The communication module to perform a test of the home network. A result of the test is provided to the test controller by sending a second wireless signal via the wireless communication interface.

Another disclosed example method includes presenting a graphical user interface to enable a user to select a test for a home network, sending a command to a home network test server via a first wireless signal in response to the selection of the test, receiving a result of the test from the home network test server via a second wireless signal, and presenting the result in the graphical user interface.

A disclosed example home network test controller includes a display device to present a graphical user interface to enable a user to select a test for a home network, and a wireless interface to send a command to a home network test server in response to the selection of the test and receive a result of the test from the home network test server. The result is presented in the graphical user interface.

A disclosed example apparatus to test a home network comprising a residential gateway includes a test controller and a test server. The test controller includes a display device and a wireless interface. The display device to present a graphical user interface to enable a user to select a test for the home network. The wireless interface to communicatively couple the test controller to the test server, send a command to the test server in response to the selection of the test, and receive a result of the test from the home network test server, the result being presented in the graphical user interface. The test server includes a second wireless communication interface, a second communication interface and a communication module. The second wireless communication interface to receive the command from the test controller. The second communication interface to establish a communicative coupling of the test server to the home network in response to the command. The communication module to perform the test. A result of the test is provided to the test controller via the second wireless communication interface.

Yet another disclosed example method includes communicatively coupling a home network test server to a home network, communicatively coupling a home network test controller to the home network test server via a wireless connection, and initiating a test of the home network by the home network test server via the home network test controller.

FIG. 1 illustrates an example home network test system 100 including a home network 105. The example home network 105 of FIG. 1 includes any type of residential gateway (RG) 110, and any number and/or type(s) of computers (one of which is designated at reference numeral 115) and/or set-top boxes (STBs) (three of which are designated at reference numerals 120-122). The example computer(s) 115 of FIG. 1 may be communicatively coupled to the example residential gateway 110 via any type of communication medium or communication technology including, but not limited to, a wireless local area network (WLAN), a wired Ethernet cable, an Ethernet over coaxial cable transceiver, an Ethernet over powerline transceiver and/or an Ethernet over twisted-pair copper wire transceiver. Example Ethernet over coaxial cable and Ethernet over twisted-pair copper wire transceivers are implemented in accordance with any past, present and/or future Home Phoneline Network Alliance (HPNA) standard, recommendation and/or specification, and/or any International Telecommunications Union—Telecommunications (ITU-T) G.995x recommendation.

While in the illustrated example of FIG. 1, the example STBs 120-122 are communicatively coupled to the example RG 110 using Ethernet over coaxial cable transceivers, the STBs 120-122 may be communicatively coupled to the RG 110 using any additional and/or alternative communication technology(-ies) described above in connection with the example computer 115.

The example RG 110 of FIG. 1 communicatively couples devices of the home network 105 (e.g., the computer 115 and the STBs 120-122) to an external network such as the Internet via a twisted-pair copper cable, a coaxial cable and/or a satellite link 125.

To increase and/or expand cellular phone coverage, the example home network 105 includes a femtocell 130. The example femtocell 130 is a cellular base station designed for use at a customer premises such as a home or small business. The example femtocell 130 connects to a cellular service provider's network (not shown) via the RG 110 and the cable or link 125.

While the example methods, apparatus and articles of manufacture to test home networks disclosed herein are described with reference to the example home network 105, the examples disclosed herein may be used and/or readily adapted to test any number and/or type(s) of additional or alternative home networks. For example, one or more of the elements and/or devices illustrated in FIG. 1 may be combined, divided, re-arranged, omitted, eliminated and/or implemented in any other way. Further, other example home networks may include one or more elements and/or devices in addition to, or instead of, those illustrated in FIG. 1, and/or may include more than one of any or all of the illustrated elements and devices. For example, the home network 105 may include and/or implement fewer or more STBs 120-122, fewer or more computers 115 and/or not include the femtocell 120. Further still, other home networks may implement other communication technologies and/or network topologies in addition to, or instead of, those illustrated in FIG. 1 and/or described above.

Given the complexity of emerging home networks and/or the variety of home network topologies, technicians increasingly need to utilize multiple test sets to install and/or troubleshoot a home network such as the example home network 105. For example, a technician may need to test, debug and/or troubleshoot issues relating Internet protocol television (IPTV), voice over Internet protocol (VoIP), WLAN and/or HPNA technologies during a single service call. In some examples, existing methods of diagnosing and/or troubleshooting problems cannot be performed without multiple technicians and/or test sets. The complexity of home networks and the equipment necessary to test them can negatively impact service provider revenue, technician dispatch efficiency and/or customer satisfaction.

To test the home network 105, the example home network test system 100 of FIG. 1 includes a home network test server 150. The example home network test server 150 of FIG. 1 is a small portable test device that a technician may use to test one or more functions and/or operations of the example home network 105. The example home network test server 150 can be configured and/or communicatively coupled to different locations of the home network 105 (e.g., as wired endpoint, a wireless endpoint, etc.). For example, the home network test server 150 may be:

(A) communicatively coupled to a Ethernet over coaxial cable jack 155 to allow the home network test server 150 to test cable connectivity (e.g., opens, shorts, impedance mismatch), network performance, network operation (ping, trace route, IP connectivity), video quality (e.g., multicast video quality measurement (VQM)), HPNA (e.g., HPNA bandwidth table, node statistics, packet errors), multi-room digital video recorder (DVR) functionality, STB verification, RG verification, and/or pre-qualify unused jacks;

(B) communicatively coupled to a wired Ethernet jack 160 to allow the home network test server 150 to test public Internet access speed, STB verification, RG verification, remote activation, and/or remote control; and/or (C) communicatively coupled to the RG 110 via a WLAN to test WLAN network (e.g., ping, trace route, IP connectivity), WLAN configuration, WLAN mode, WLAN security, WLAN power level, WLAN signal strength, WLAN channel number, WLAN network detection, WLAN connection speed, WLAN throughput, remote activation, and/or remote control.

Figure 2:
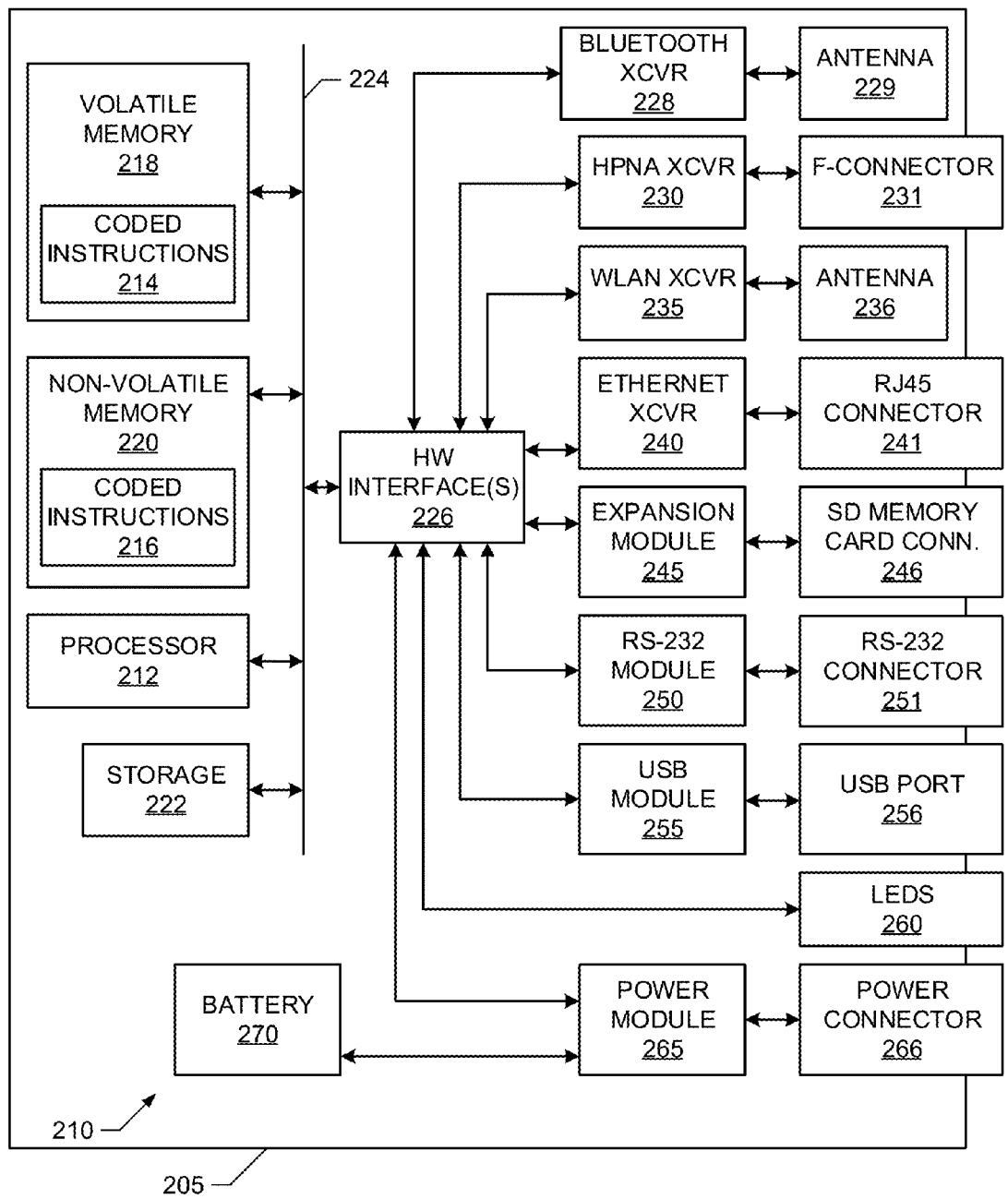
FIGS. 2, 3A, and 3B illustrate an example manner of implementing the example home network test server of FIG. 1.
Figure 3A:
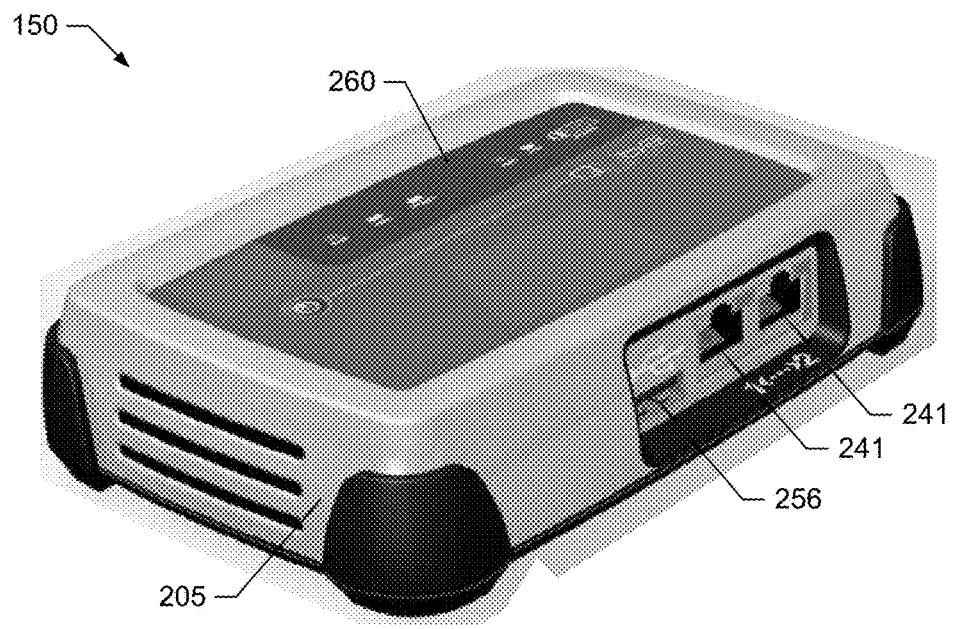
Figure 3B:
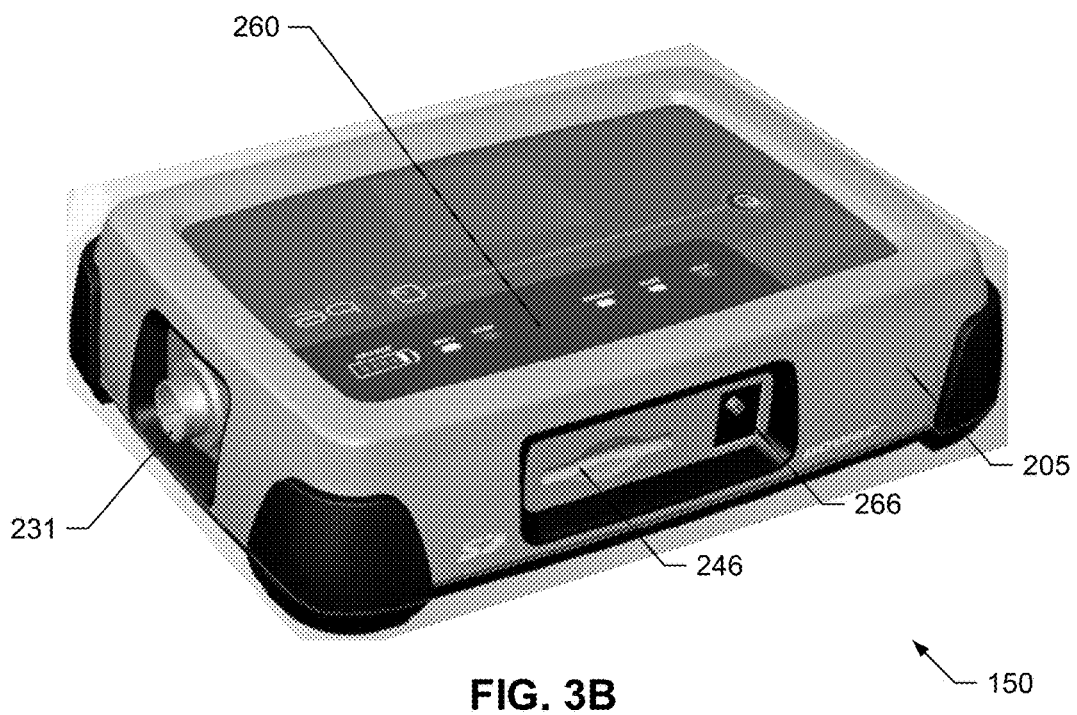

As shown in FIGS. 2, 3A and 3B, the home network test server 150 includes different peripheral connections to enable testing of different aspects of the home network 105. Each of the example peripheral connections of FIGS. 2, 3A and 3B are capable to implement the functionality of a standalone test device. In other words, the example home network test server 150 integrates the functionality of multiple standalone test devices. The home network test server 150 also includes internal and/or removable storage to enable the storage and subsequent retrieval of test results. Because the example home network test server 150 of FIG. 1 is an Internet protocol (IP) based server, technicians can remotely access the home network test server 150 to test the example home network 105.

In some examples, the home network test server 150 includes interfaces (e.g., an RS-232 interface) and/or graphical user interfaces (GUIs) that enable the home network test server 150 to communicate and/or interact with traditional backend testing systems such as Lightspeed Broadband Test (LSBBT) and Simplified Customer Account Navigation and Resolution Tool (SCANR) and/or non home network equipment and/or devices such as a fiber optic multiplexor.

To facilitate configuration, control and/or use of the home network test server 150, the example home network test system 100 of FIG. 1 includes a home network test controller 190. The example home network test controller 190 of FIG. 1 is communicatively coupleable to the home network test server 150 via a wireless connection such as a WLAN connection and/or a wireless Bluetooth® connection. An example home network test controller 190 comprises a laptop computer, a netbook computer, a tablet computer such as an IPad™, or a smartphone such as an iPhone®, a Blackberry® or an Android™ based phone and/or any other mobile or handheld device having a wireless interface. As described below in connection with FIGS. 17-22, the example home network test controller 190 presents one or more GUIs to allow a user of the home network test controller 190 to configure, control and/or use the example home network test server 150 without having to physically be at the home network test server 150. For example, the home network test controller 190 can be used as the technician moves around a customer premises to test, debug and/or troubleshoot the home network 105 without have to change the location of the home network test server 150.

Figure 4:
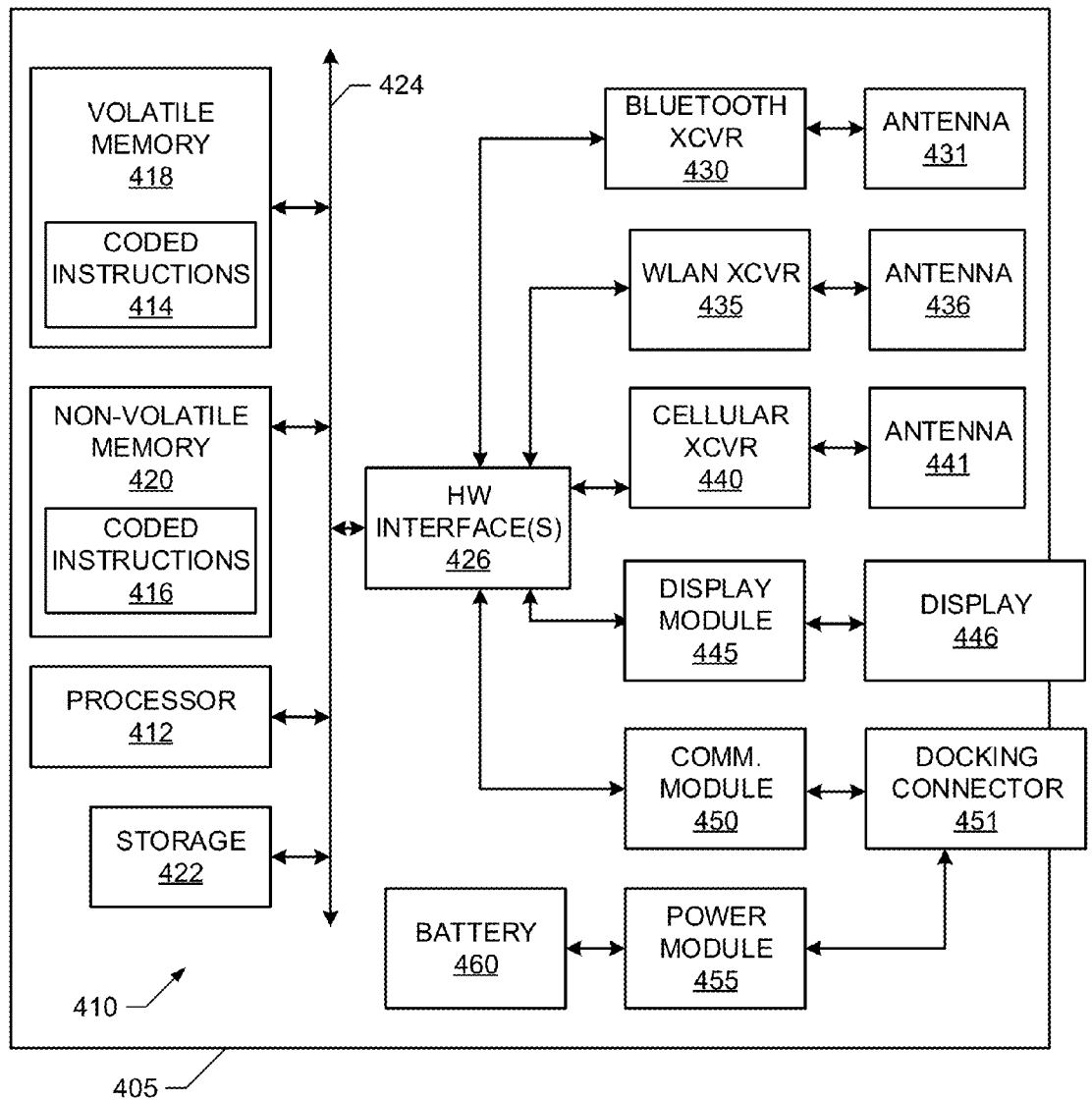
FIG. 4 illustrates an example manner of implementing the example home network test controller of FIG. 1.

Additionally or alternatively, the home network test controller 190 can be remotely accessed and/or controlled via the example cable or link 125 without the technician even being at the customer premises containing the home network 105. The home network test controller 190 can also be communicatively coupled to the example femtocell 130 via a cellular to test and/or qualify the femtocell 130. An example manner of implementing the example home network test server 150 is shown in FIG. 4.

FIG. 2 illustrates an example manner of implementing the example home network test server 150 of FIG. 1. The example home network test server 150 of FIG. 2 includes a housing 205 and a processor platform 210 implemented within the housing 205. An example housing 205 is illustrated in FIGS. 3A and 3B. The example processor platform 210 of FIG. 2 is capable of executing the example processes of FIGS. 8-15 to test a home network such as the example home network 105.

The processor platform 210 of FIG. 2 includes at least one programmable processor 212. For example, the processor 212 of FIG. 2 can be implemented by one or more Intel® microprocessors from the Pentium® family, the Itanium® family or the Xscale® family. Of course, other processors from other processor families and/or manufacturers are also appropriate. The example processor 212 executes coded instructions 214 and/or 216 present in main memory of the processor 212 (e.g., within a volatile memory 218 and/or a non-volatile memory 220) and/or in a storage device 222. The processor 212 may execute, among other things, the machine-accessible instructions to perform the processes of FIGS. 8-15 to test a home network such as the example home network 105. Thus, the coded instructions 214, 216 may include the instructions to implement the processes of FIGS. 8-15.

In the example of FIG. 2, the coded instructions 214, 216 also include machine-accessible instructions representing a primary operating system such as any version of the Linux® operating system. The primary operating system includes and/or implements communication protocols such as secure shell (SSH), file transfer protocol (FTP), transmission control protocol (TCP), IP, etc. to facilitate testing of the home network 105. The example coded instructions 214, 216 include additional machine-accessible instructions representing a secondary operating system such as the Windows CE® operating system executing as a sub-component of the primary operating system. The secondary operating system is used to enable interactions with legacy systems and/or devices relying on graphic intensive interfaces intended for use with Windows CE based devices.

The example processor 212 of FIG. 2 is in communication with the main memory including the non-volatile memory 220, the volatile memory 218 and the storage device 222 via a bus 224. The volatile memory 218 may be implemented by Synchronous Dynamic Random Access Memory (SDRAM), Dynamic Random Access Memory (DRAM), RAMBUS Dynamic Random Access Memory (RDRAM) and/or any other type of RAM device. The non-volatile memory 220 may be implemented by flash memory and/or any other desired type of memory device. Access to the memories 218, 220 may be controlled by a memory controller.

To allow the example processor 212 to interact with hardware devices, the processor platform 210 of FIG. 2 includes any number and/or type(s) of hardware interface(s) 226. The example hardware interface(s) 226 of FIG. 2 facilitate(s) communication between the processor 212 and a Bluetooth® transceiver 228, an HPNA transceiver 230, a WLAN transceiver 235, an Ethernet transceiver 240, an expansion module 245, an RS-232 module 250, a universal serial bus (USB) module 255, light emitting diodes (LEDs) 260 and a power module 265.

To communicatively couple the home network test server 150 to the example home network test controller 190, the example processor platform 210 of FIG. 2 includes the example Bluetooth transceiver 228 and an antenna 229. The example Bluetooth transceiver 228 of FIG. 2 enables the example processor 212 to exchange commands, messages and/or data with a processor of the example home network test controller 190. Additionally or alternatively, the processor 212 can exchange commands, messages and/or data with the example home network test controller 190 via the example WLAN transceiver 235.

To enable testing of an HPNA based Ethernet over coaxial cable network, the example processor platform 210 of FIG. 2 includes the example HPNA transceiver 230 and an F-connector 231. The example HPNA transceiver 230 of FIG. 2 is able to join or become a member of an HPNA based network such as that shown in FIG. 1. The example HPNA transceiver 230 is implemented in accordance with any of the ITU-T G.995x recommendations for HPNA transceivers. The example processor 212 is able via the HPNA transceiver 230 to perform one or more tests of the HPNA network such as, but not limited to, ping, trace route, IP connectivity, HPNA bandwidth table, HPNA node statistics, packet errors and/or multicast VQM.

To enable testing of a WLAN, the example processor platform 210 of FIG. 2 includes the example WLAN transceiver 235 and an antenna 236. The example WLAN transceiver 235 of FIG. 2 is able to join or become a member of WLAN such as the WLAN shown in FIG. 1. The example WLAN transceiver 235 is implemented in accordance with any of the Institute of Electrical and Electronic Engineer (IEEE) 802.11x standards for WLANs. In some examples, the antenna 229 is shared by the example Bluetooth transceiver 228 and the example WLAN transceiver 235, enabling the example antenna 236 to be omitted. The example processor 212 is able via the WLAN transceiver 235 to perform one or more tests of the WLAN such as, but not limited to, ping, trace route, IP connectivity, WLAN reportable information (e.g., MAC, mode, security, power level, signal strength and/or channel number), WLAN detection and/or multicast VQM.

To enable testing of a wired Ethernet network, the example processor platform 210 of FIG. 2 includes the example Ethernet transceiver 240 and one or more RJ45 connectors 241. The example Ethernet transceiver 240 of FIG. 2 is able to join or become a member of local area network (LAN) such as that shown in FIG. 1. The example Ethernet transceiver 240 is implemented in accordance with any of the IEEE 802.1x standards for LANs. The example processor 212 is able via the Ethernet transceiver 240 to perform one or more tests of the LAN such as, but not limited to, ping, trace route, IP connectivity, WLAN reportable information (e.g., MAC, mode, security, power level, signal strength and/or channel number), WLAN detection and/or multicast VQM.

To provide user removable storage, the example processor platform 210 of FIG. 2 includes the example expansion module 245 and a secure digital (SD™) memory card connector 246, and the example USB module 255 and a USB port 256. Results of tests performed by the processor 212 may be stored on the memory 218, an SD memory card inserted into the SD memory card connector 246 and/or on a USB storage device inserted into the USB port 256. In some examples, the coded instructions 214 and 216 may be updated and/or upgraded from machine-accessible instructions stored on an inserted SD memory card and/or an inserted USB storage device.

To facilitate communication with legacy devices such as a fiber optic multiplexor, the example processor platform 210 of FIG. 2 may optionally include the example RS-232 module 250 and an RS-232 connector 251. Other optional modules, connectors and/or interfaces that may be include in the home network test server 150 include, but are not limited to, a dialup modem.

To provide status information, the example processor platform 210 includes the example LEDs 260. The example LEDs 260 of FIG. 2 include a sync LED, a data transmission LED, an error LED, a power LED, a link LED and a battery status LED. The example LEDs 260 allow a technician to quickly check the status of the example home network test server 150 without use of the example home network test controller 190. However, the information presented by the LEDs 260 may, additionally or alternatively, be accessed via the home network test controller 190.

To provide power, the example processor platform 210 includes the example power module 265, a power connector 266 and a battery 270. The example home network test server 150 of FIG. 2 may be powered via the power connector 266 and/or by the battery 270. The example battery 270 may be charged via the example power connector 266. The example battery 270 of FIG. 2 is a field swappable and/or replaceable Li-Ion rechargeable battery.

In some examples, the processor platform 210 also includes one or more mass storage devices 222 to store software and/or data. Examples storage devices 222 include a floppy disk drive, a hard disk drive, a solid-state hard disk drive, a CD drive, a DVD drive and/or any other solid-state, magnetic and/or optical storage device. The example storage devices 222 may be used to, for example, store coded instructions and/or home network test results.

FIGS. 3A and 3B depict an example housing 205 that may be used to house and/or contain the example processor platform 210 of FIG. 1. As shown in FIGS. 3A and 3B, the example housing 205 exposes the example F-connector 231, the example RJ45 connector(s) 241, the example SD memory card connector 246, the example USB port 256, the example LEDs 260 and the power connector 266 of FIG. 2 for use and/or access by a user of the example home network test server 150.

While an example manner of implementing the example home network test server 150 of FIG. 1 is illustrated in FIGS. 2, 3A and 3B, one or more of the elements, modules, processors, transceivers, modules, connectors, ports and/or devices illustrated in FIGS. 2, 3A and 3B may be combined, divided, re-arranged, omitted, eliminated and/or implemented in any other way. Further, the home network test server 150 may include one or more elements, modules, processors, transceivers, modules, connectors, ports and/or devices in addition to, or instead of, those illustrated in FIGS. 2, 3A and 3B, and/or may include more than one of any or all of the illustrated elements, modules, processors, transceivers, modules, connectors, ports and/or devices.

FIG. 4 illustrates an example manner of implementing the example home network test controller 190 of FIG. 1. The example home network test controller 190 of FIG. 4 includes a housing 405 and a processor platform 410 implemented within the housing 405. The example processor platform 410 of FIG. 4 is capable of executing the example process of FIG. 16 to test a femtocell and/or to present the example GUIs of FIGS. 17-22. The example home network test controller 190 of FIG. 4 can be, for example, a laptop computer, a netbook computer, a tablet computer such as an iPad, or a smartphone such as an iPhone, a Blackberry or an Android based phone and/or any other type of portable, mobile or handheld device containing a processor and a wireless interface.

The example processor platform 410 of FIG. 4 includes at least one programmable processor 412. For example, the processor 412 can be implemented by one or more Intel® microprocessors from the Pentium family, the Itanium family or the Xscale family. Of course, other processors from other processor families and/or manufacturers are also appropriate. The example processor 412 of FIG. 2 executes coded instructions 414 and/or 416 present in main memory of the processor 412 (e.g., within a volatile memory 418 and/or a non-volatile memory 420) and/or in a storage device 422. The processor 412 may perform, among other things, the example process of FIG. 16 to test a femtocell and/or to present the example GUIs of FIGS. 17-22. Thus, the coded instructions 414, 416 may include the instructions to implement the example processes of FIG. 16.

The example processor 412 of FIG. 4 is in communication with the main memory including the non-volatile memory 420 and the volatile memory 418, and the storage device 422 via a bus 424. The volatile memory 418 may be implemented by Synchronous Dynamic Random Access Memory (SDRAM), Dynamic Random Access Memory (DRAM), RAMBUS Dynamic Random Access Memory (RDRAM) and/or any other type of RAM device. The non-volatile memory 420 may be implemented by flash memory and/or any other desired type of memory device. Access to the memories 418, 420 may be controlled by a memory controller.

To allow the example processor 412 of FIG. 4 to interact with hardware devices, the processor platform 410 of FIG. 4 includes any number and/or type(s) of hardware interface(s) 426. The example hardware interface(s) 426 facilitate(s) communication between the processor 412 and a Bluetooth transceiver 430, a WLAN transceiver 435, a cellular transceiver 440, a display module 445, a communication module 450 and a power module 455.

To communicatively couple the home network test controller 190 to the example home network test server 150, the example processor platform 410 of FIG. 4 includes the example Bluetooth transceiver 430 and an antenna 431. The example Bluetooth transceiver 430 of FIG. 4 enables the example processor 412 to exchange commands, messages and/or data with the example home network test server 150. Additionally or alternatively, the processor 412 can exchange commands, messages and/or data with the example home network test controller 190 via the WLAN transceiver 435.

To communicatively couple the home network test controller 190 to a WLAN and/or the example home network test server 150, the example processor platform 410 of FIG. 4 includes the example WLAN transceiver 435 and an antenna 436. The example WLAN transceiver 435 of FIG. 4 is able to join or become a member of WLAN such as that shown in FIG. 1. The example WLAN transceiver 435 is implemented in accordance with any of the Institute of Electrical and Electronic Engineer (IEEE) 802.11x standards for WLANs. In some examples, the antenna 431 is shared by the example Bluetooth transceiver 430 and the example WLAN transceiver 435, enabling the example antenna 436 to be omitted. The example processor 412 is able via the WLAN transceiver 435 to exchange commands, messages and/or data with the example home network test server 150.

To communicatively couple the home network test controller 190 to the example femtocell 130 and/or a service provider's cellular base station, the example processor platform 410 of FIG. 4 includes the example cellular transceiver 440 and an antenna 441. In addition to enabling voice communication via the home network test server 190, the example processor 412 is able via the example cellular transceiver 440 of FIG. 4 to perform one or more tests of the femtocell 130.

To present a user interface, the example processor platform 410 of FIG. 4 includes the example display module or device 445. The example display device 445 of FIG. 4 receives data and/or value representing a GUI and presents or displays the GUI on a display 446 such as a touch screen 446.

To communicatively couple the home network test controller 190 to a computer, the example processor platform 410 of FIG. 4 includes the example communication module 450 and a docking connector 451. The example processor 412 is able via the communication module 450 to exchange data with a computer via the docking connector 451. In some examples, the coded instructions 414 and 416 may be updated and/or upgraded from machine-accessible instructions received via the docking connector 451.

To provide power, the example processor platform 410 includes the example power module 455, the example docking connector 451 and a battery 460. The example home network test controller 190 of FIG. 4 may be powered via the connector 451 and/or by the battery 460. Additionally, the battery 460 may be charged via the docking connector 451. In some examples, the battery 460 is user and/or field replaceable or swappable battery.

In some examples, the processor platform 410 also includes one or more mass storage devices 422 to store software and/or data. Examples of such storage devices 422 include a floppy disk drive, a hard disk drive, a solid-state hard disk drive, a CD drive, a DVD drive and/or any other solid-state, magnetic and/or optical storage device. The example storage devices 422 may be used to, for example, store the coded instructions and/or home network test results.

While an example manner of implementing the example home network test controller 190 of FIG. 1 is illustrated in FIG. 4, one or more of the elements, modules, processors, transceivers, modules, connectors, ports and/or devices illustrated in FIG. 4 may be combined, divided, re-arranged, omitted, eliminated and/or implemented in any other way. Further, the home network test controller 190 may include one or more elements, modules, processors, transceivers, modules, connectors, ports and/or devices in addition to, or instead of, those illustrated in FIG. 4, and/or may include more than one of any or all of the illustrated elements, modules, processors, transceivers, modules, connectors, ports and/or devices.

Figure 5:
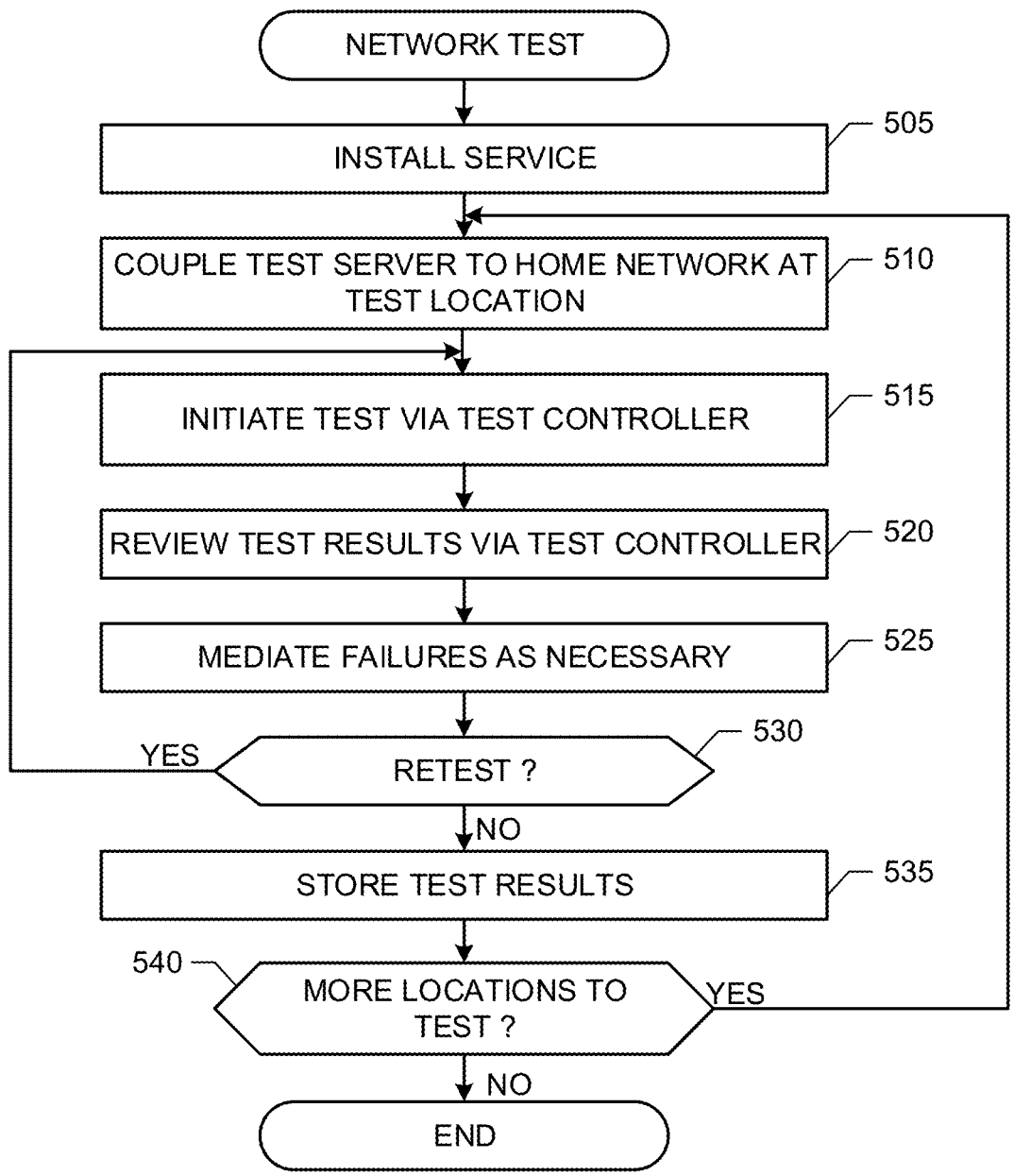
FIGS. 5-7 are flowcharts representing example processes that may be performed by a user to operate the example home network test system of FIGS. 1, 2, 3A, 3B, and 4.
Figure 6:
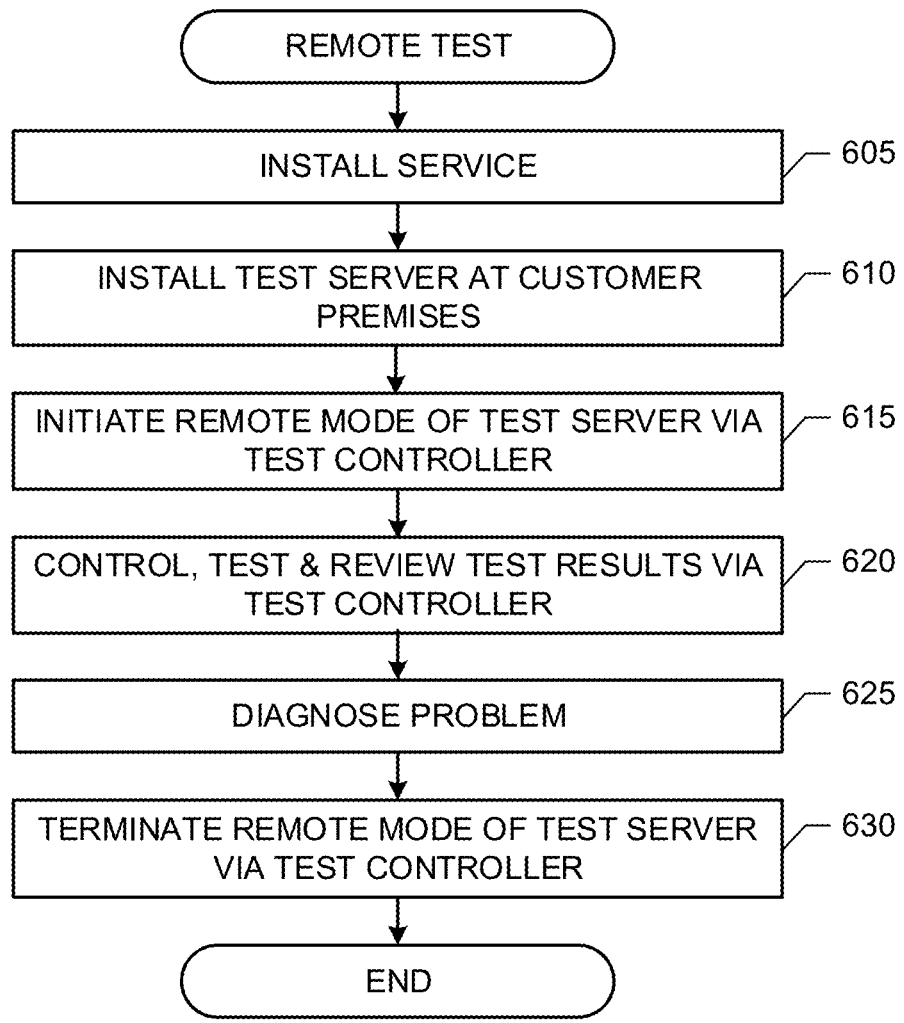
Figure 7:
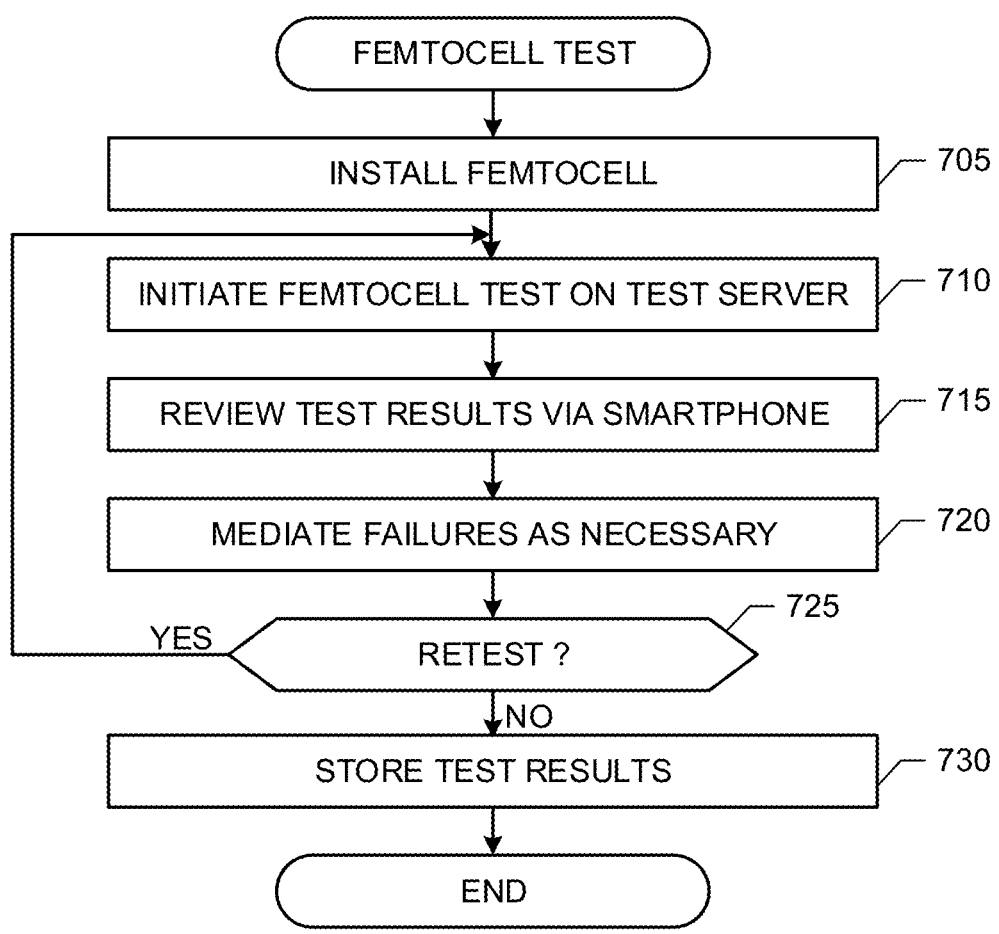

FIGS. 5, 6 and 7 are flowcharts representing example processes that may be carried out or performed by, for example, a user such as a service technician to test a home network such as the example home network 105 of FIG. 1. Other methods of implementing the example operations of FIGS. 5-7 may be employed. For example, the order of execution of the blocks may be changed, and/or one or more of the blocks described may be changed, eliminated, subdivided, or combined. Additionally, the blocks of any or all of the example processes of FIGS. 5-7 may be carried out sequentially and/or carried out in parallel by, for example, multiple persons.

The example process of FIG. 5 may be performed to carry out any number and/or type(s) of tests of a home network such as the example home network 105. The example process of FIG. 5 begins with the installation and/or configuration of a new service such as an HPNA based network, a DVR, an RG, a WLAN, etc. (block 505). The example home network test server 150 is communicatively coupled to the home network at a first test location (e.g., at the example HPNA jack 155 to perform an HPNA test, a DVR test and/or a video quality test, at the example jack 160 to perform a Internet connection test, an Internet access speed test and/or a RG test, and/or at a WLAN location to perform a test of a WLAN) (block 510).

Figure 17:
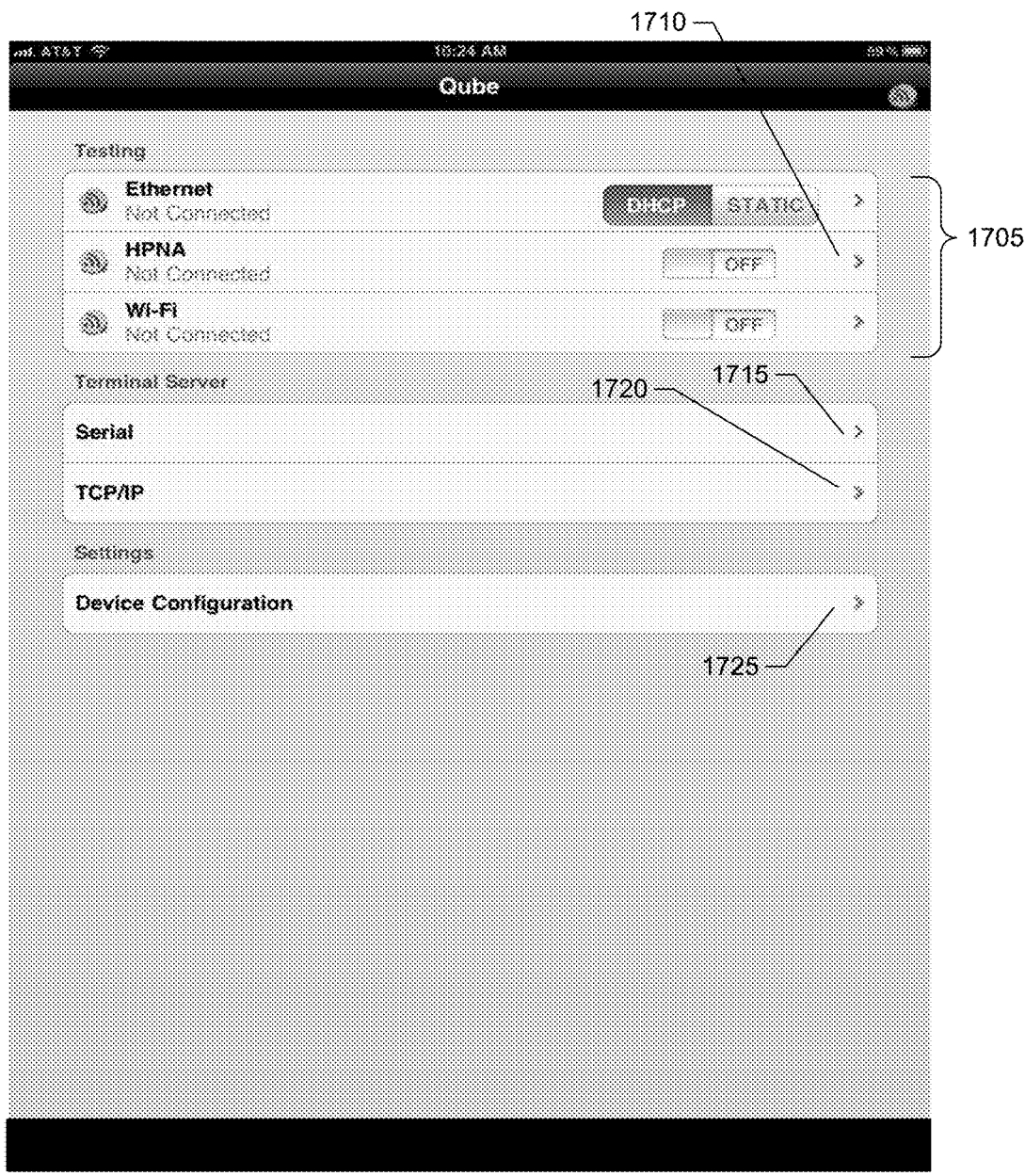
FIGS. 17-26 illustrate example user interfaces that may be presented by the example home network test controller of FIGS. 1 and 4 to enable a user to operate the example home network test system of FIG. 1.
Figure 18:
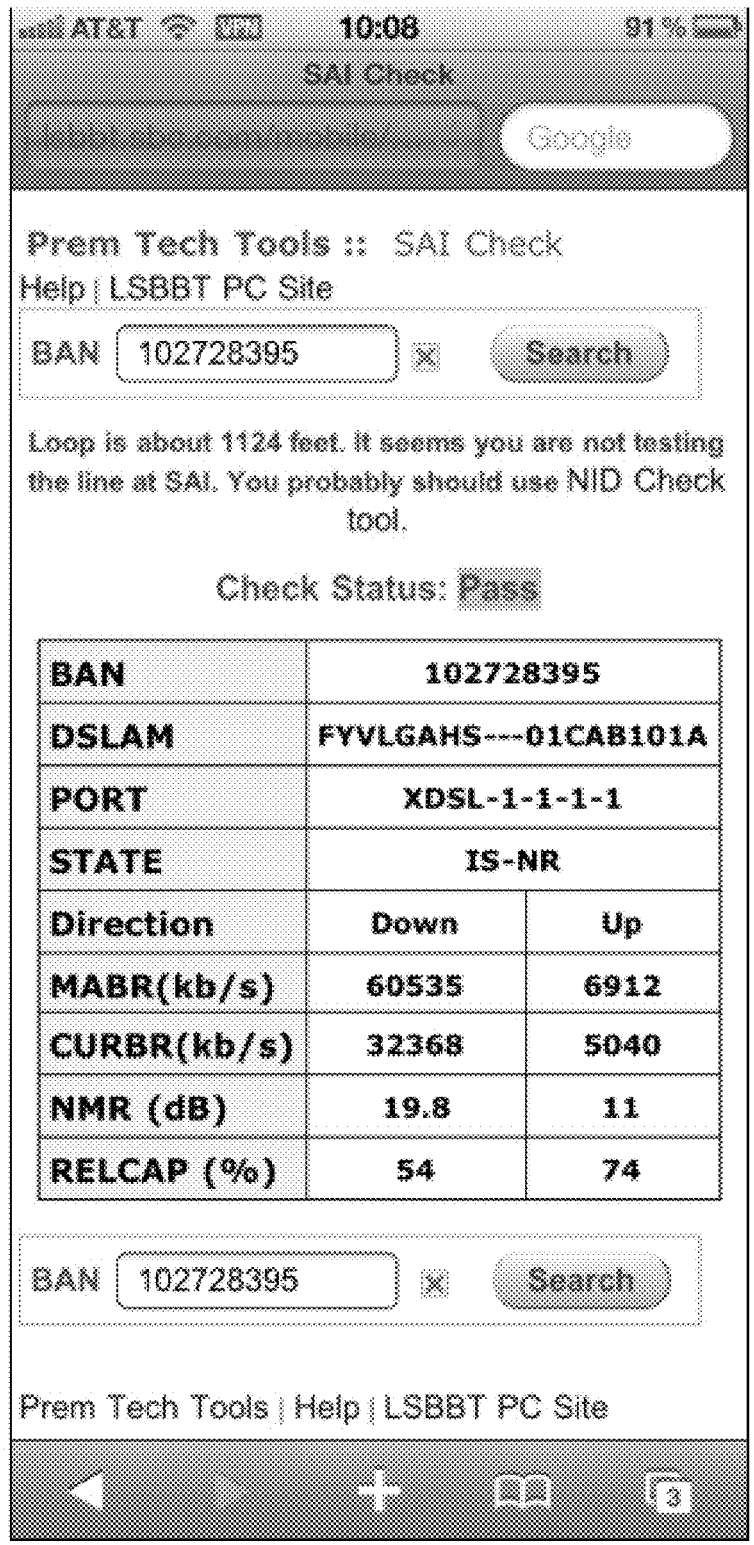
Figure 19:
Figure 20:
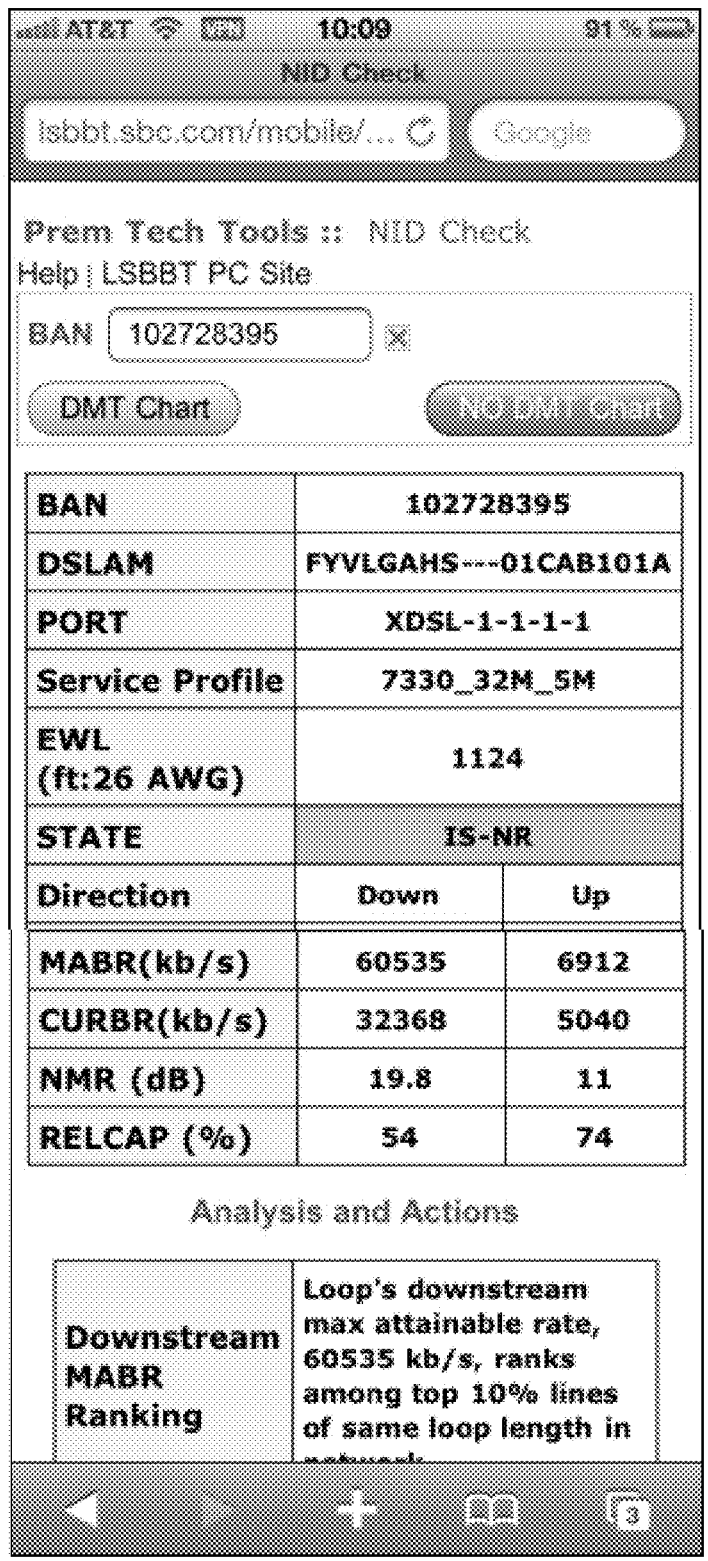
Figure 21:
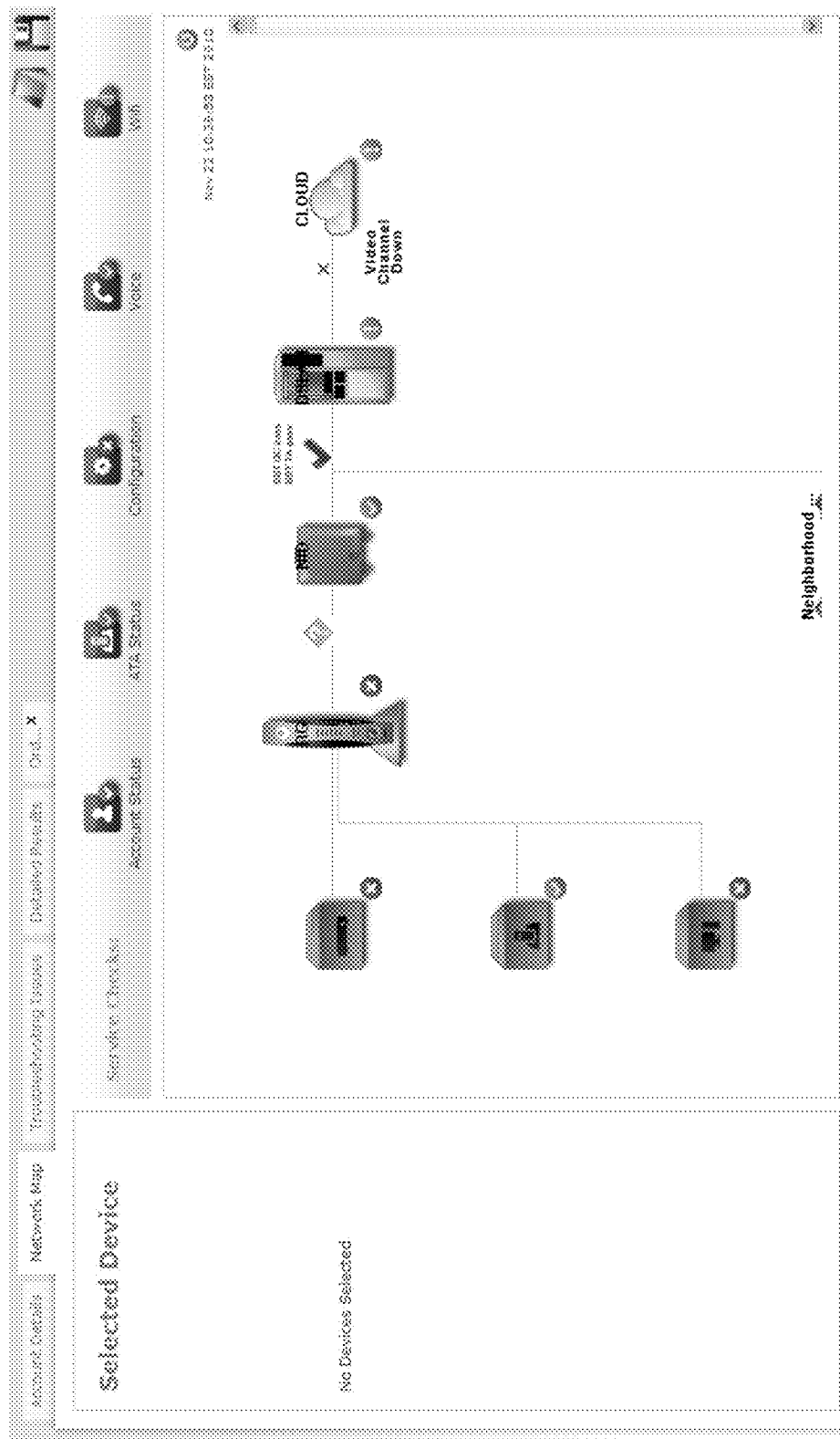
Figure 22:
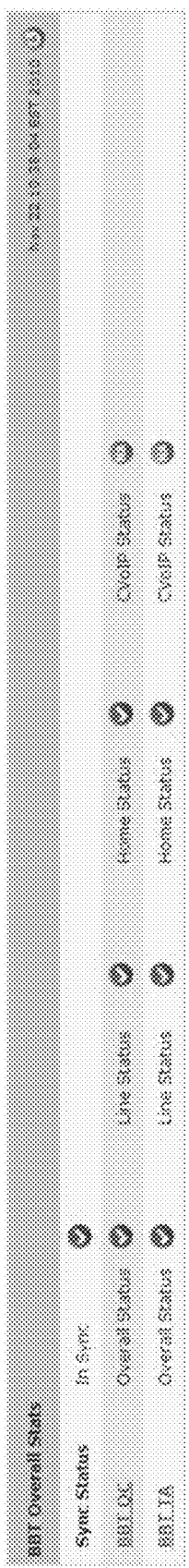

Using the example home network test controller 190, a user selects and initiates a test using an interface such as the example GUI shown in FIG. 17 (block 515). In response to the selection, the home network test controller 190 sends a command and/or signal to the home network test server 150 via a wireless signal to trigger initiation of the selected test. The home network test server 150 performs the test and provides one or more results of the test of the home network test controller 190. The results of the test are reviewed by the user via an interface of the home network test controller 190 (block 520). Example GUIs that may be displayed at the home network test controller 190 to present test results are shown in FIGS. 18-22. In some examples, the home network test controller 190 presents information identifying potential home network conditions (e.g., crosstalk, low signal strength, short, open, etc.) that warrant investigation by the user.

As applicable and appropriate, the user mediates (e.g., debugs, troubleshoots, repairs and/or corrects) conditions in the home network that result in an unsatisfactory test result (block 525). If the user wants to test their mediation (block 530), the user reinitiates the test via the home network test controller (block 515).

If the user does not want to retest (block 530), the user optionally stores test results on the home network test controller 190 and/or the home network test server 150 (block 535). If there are more locations to test (block 540), control returns to block 510 to test the next location. If test is complete (block 540), control exits from the example process of FIG. 5.

The example process of FIG. 6 may be performed to carry out any number and/or type(s) of remote tests of a home network such as the example home network 105. The example process of FIG. 6 begins with the installation and/or configuration of a new service such as an HPNA based network, a DVR, an RG, a WLAN, etc. (block 605). The example home network test server 150 is communicatively coupled to the home network at a location within the customer premises (e.g., at the example HPNA jack 155 to perform an HPNA test, a DVR test and/or a video quality test, at the example jack 160 to perform a Internet connection test, an Internet access speed test and/or a RG test, and/or at a WLAN location to perform a test of a WLAN) (block 610).

Using the example home network test controller 190, a user initiates a remote control mode of the home network test server 150 (block 615). In response to initiation of the remote control mode, the home network test server 150 obtains an IP address from the RG 110 and configures the RG 110 to expose the IP address and a port of the RG 110 to the home network test controller 190. From any location with wired, wireless and/or cellular Internet connectivity, public or private, to the RG 110, the user interacts with the home network test controller 190 to select and initiate tests to be performed by the home network test server 150 and to review test results (block 620).

Based on the tests and test results, the user mediates (e.g., debugs, troubleshoots, repairs and/or corrects) conditions in the home network and/or a service provider network that result in an unsatisfactory test result (block 625). Using the example home network test controller 190, a user terminates the remote control mode of the home network test server 150 (block 630) and control exits from the example process of FIG. 6. In response to termination of the remote control mode, the home network test server 150 releases the IP address and configures the RG 110 to hide the IP address and the port of the RG 110.

The example process of FIG. 7 may be performed to carry out any number and/or type(s) of tests of a femtocell such as the example femtocell 130. The example process of FIG. 7 begins with the installation and/or configuration of the femtocell (block 705). Using the example home network test controller 190, a user selects and initiates a femtocell test using an interface such as the example GUI shown in FIG. 17 (block 710). In response to the selection, the home network test controller 190 performs the selected femtocell test. The home network test controller 190 performs the test and provides one or more results of the test of the home network test controller 190. The results of the test are reviewed by the user via an interface of the home network test controller 190 (block 715). In some examples, the home network test controller 190 presents information identifying potential home network conditions (e.g., missing signal) that warrant investigation by the user.

As applicable and appropriate, the user mediates (e.g., debugs, troubleshoots, repairs and/or corrects) conditions in the home network and/or femtocell that result in an unsatisfactory test result (block 720). If the user wants test their mediation (block 725), the user reinitiates the test via the home network test controller 190 (block 710).

If the user does not want to retest (block 725), the user optionally stores test results on the home network test controller 190 (block 730). Control then exits from the example process of FIG. 7.

FIGS. 8-15 are flowcharts representing example processes that may be embodied as machine-accessible instructions and executed by, for example, one or more processors to test a home network. A processor, a controller and/or any other suitable processing device may be used, configured and/or programmed to perform the example processes of FIGS. 8-15. For example, the processes of FIGS. 8-15 may be embodied in coded instructions stored on a tangible article of manufacture such as a tangible computer-readable medium. Machine-readable instructions comprise, for example, instructions that cause a processor, a computer and/or a machine having a processor (e.g., the example processor platform 210 of FIG. 2) to perform one or more particular processes. Alternatively, some or all of the example processes of FIGS. 8-15 may be implemented using any combination(s) of application specific integrated circuit(s) (ASIC(s)), programmable logic device(s) (PLD(s)) and/or field programmable logic device(s) (FPLD(s)), field-programmable gate array(s) (FPGA(s)), fuses, discrete logic, hardware, firmware, etc. Also, some or all of the example processes of FIGS. 8-15 may be implemented manually or as any combination of any of the foregoing techniques, for example, any combination of firmware, software, discrete logic and/or hardware. Further, many other methods of implementing the example operations of FIGS. 8-15 may be employed. For example, the order of execution of the blocks may be changed, and/or one or more of the blocks described may be changed, eliminated, sub-divided, or combined. Additionally, the blocks of any or all of the example processes of FIGS. 8-15 may be carried out sequentially and/or carried out in parallel by, for example, separate processing threads, processors, devices, discrete logic, circuits, etc.

As used herein, the term tangible computer-readable medium is expressly defined to include any type of computer-readable medium and to expressly exclude propagating signals. Example computer-readable medium include, but are not limited to, a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform 210 discussed in connection with FIG. 2 and/or the example processor platform 410 discussed in connection with FIG. 4. As used herein, the term non-transitory computer-readable medium is expressly defined to include any type of computer-readable medium and to exclude propagating signals.

Figure 8:
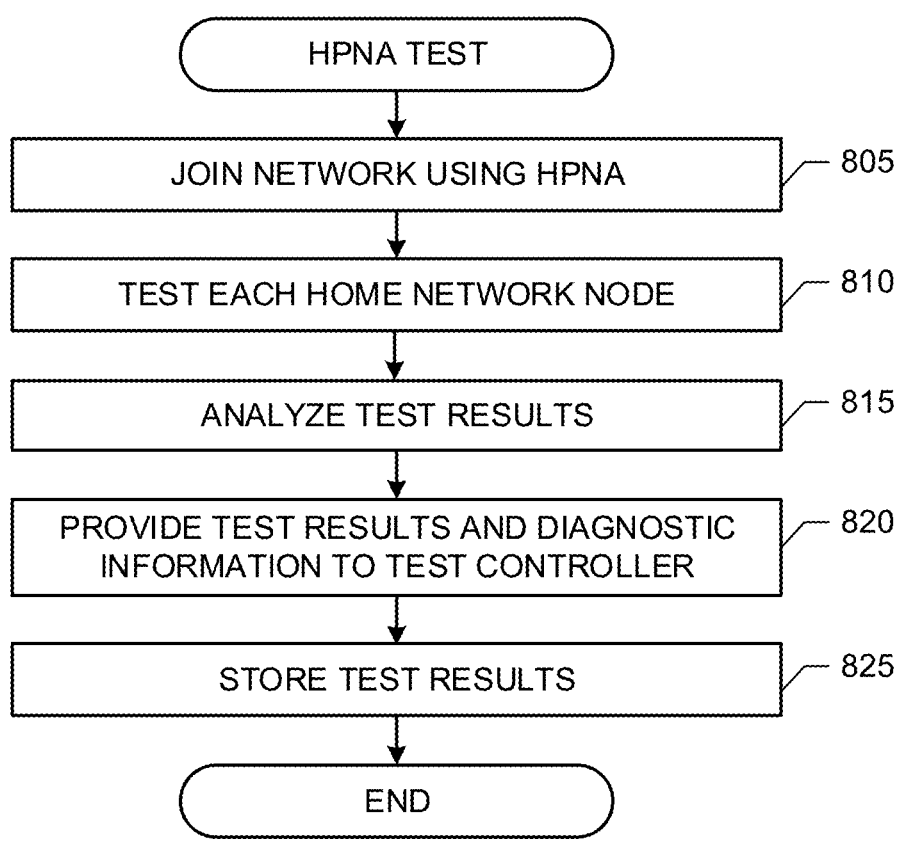
FIGS. 8-15 are flowcharts representing example processes that may be embodied as machine-accessible instructions and executed by, for example, one or more processors to implement the example home network test servers of FIGS. 1, 2, 3A, 3B, and 3.

The example process of FIG. 8 may be carried out by the example home network test server 150 to test an HPNA based network such as that shown in FIG. 1. The example process of FIG. 8 begins with the example HPNA transceiver 230 joining the HPNA network (block 805). The example processor 212 via the HPNA transceiver 230 tests each HPNA node of the HPNA network for, for example, throughput, errors and/or faults (block 810). In some examples, the processor 212 processes the results of the tests to identify potential faults needing mediation by a user and/or technician (block 815). The processor 212 provides the test results and/or identified potential faults to the home network test controller 190 via the Bluetooth transceiver 228 and/or the WLAN transceiver 235 (block 820). In a remote test scenario, the test results and/or identified potential faults may be provided to the home network test controller 190 via the Ethernet transceiver 240. Depending on its configuration, the example processor 212 stores the test results and/or identified potential faults in the memory 218, the storage device(s) 222, on an inserted SD card and/or on an inserted USB device (block 825). Control then exits from the example process of FIG. 8.

Figure 9:
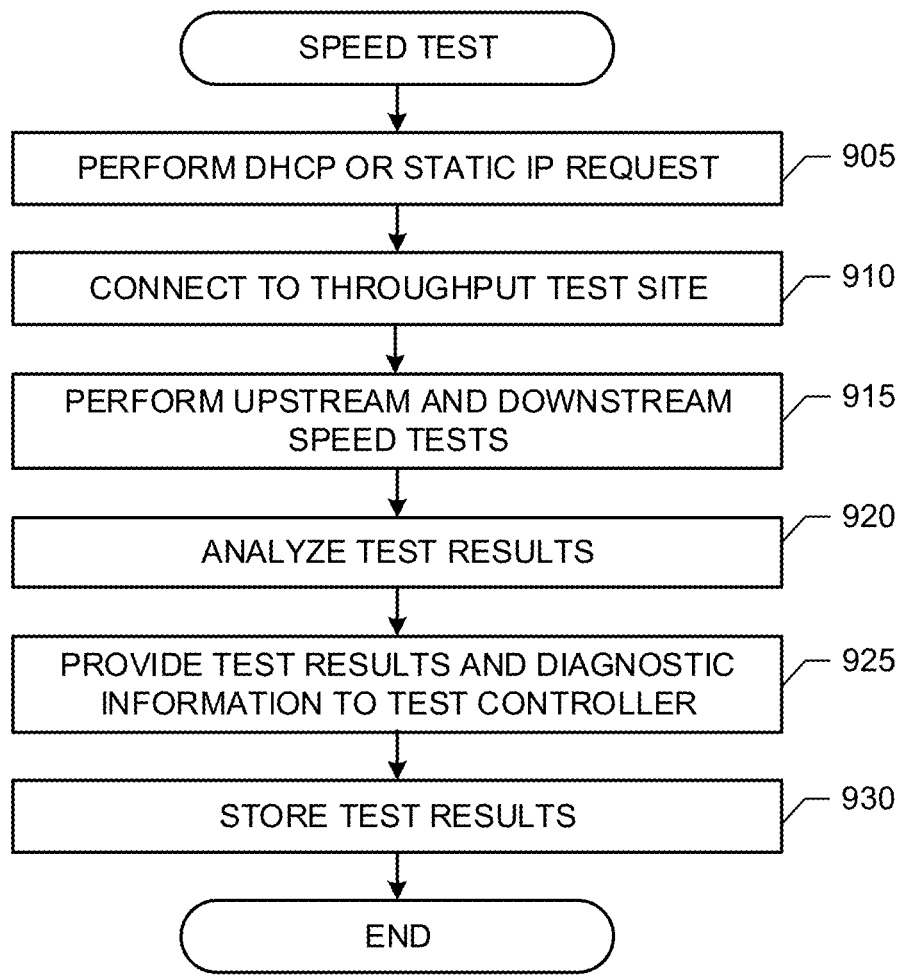

The example process of FIG. 9 may be carried out by the example home network test server 150 to test Internet access speed. The example process of FIG. 9 begins with the example Ethernet transceiver 240 performing a domain host control protocol (DHCP) query or a static IP request to obtain an IP address (block 905). The example processor 212 via the Ethernet transceiver 240 connects to a service provider throughput test server (block 910) and performs upstream and downstream Internet access speed tests (block 915). In some examples, the processor 212 processes the results of the tests to identify potential faults needing mediation by a user and/or technician (block 920). The processor 212 provides the test results and/or identified potential faults to the home network test controller 190 via the Bluetooth transceiver 228 and/or the WLAN transceiver 235 (block 925). In a remote test scenario, the test results and/or identified potential faults may be provided to the home network test controller 190 via the Ethernet transceiver 240. Depending on its configuration, the example processor 212 stores the test results and/or identified potential faults in the memory 218, the storage device(s) 222, on an inserted SD card and/or on an inserted USB device (block 930). Control then exits from the example process of FIG. 9.

Figure 10:
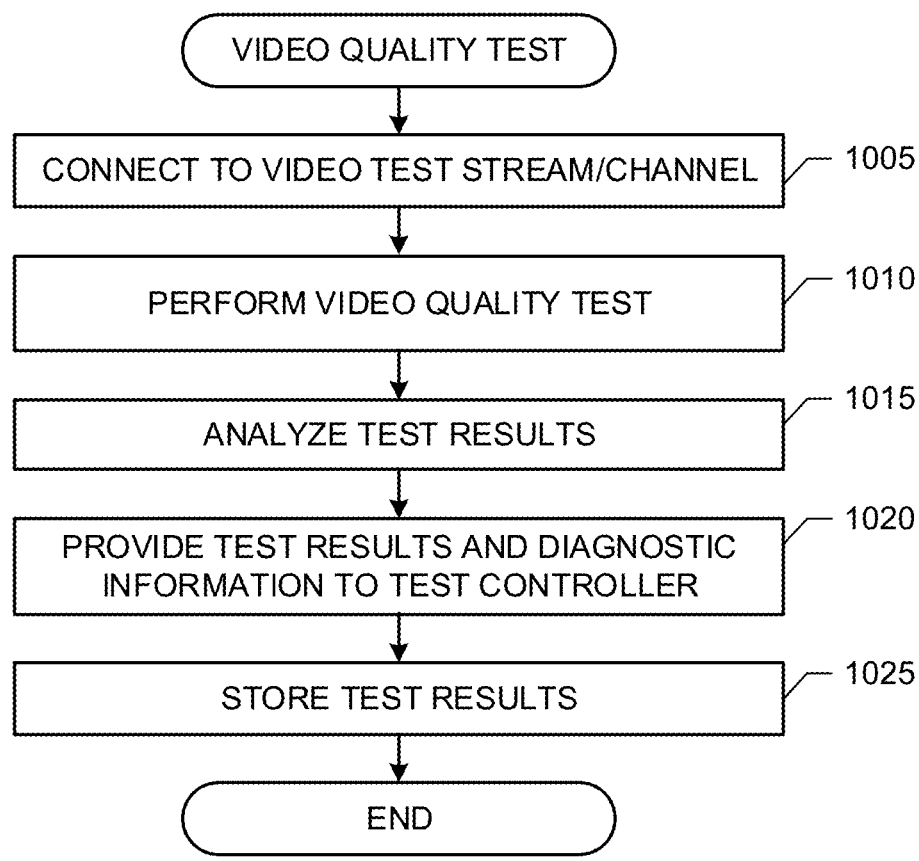

The example process of FIG. 10 may be carried out by the example home network test server 150 to test video quality. The example process of FIG. 10 begins with the example processor 212 connecting to a video test stream and/or channel via the HPNA transceiver 230 and/or the Ethernet transceiver 240 (block 1005). The example processor 212 performs a video test such as Spirent's multicast VQM (block 1010). In some examples, the processor 212 processes the results of the tests to identify potential faults needing mediation by a user and/or technician (block 1015). The processor 212 provides the test results and/or identified potential faults to the home network test controller 190 via the Bluetooth transceiver 228 and/or the WLAN transceiver 235 (block 1020). In a remote test scenario, the test results and/or identified potential faults may be provided to the home network test controller 190 via the Ethernet transceiver 240. Depending on its configuration, the example processor 212 stores the test results and/or identified potential faults in the memory 218, the storage device(s) 222, on an inserted SD card and/or on an inserted USB device (block 1025). Control then exits from the example process of FIG. 10.

Figure 11:
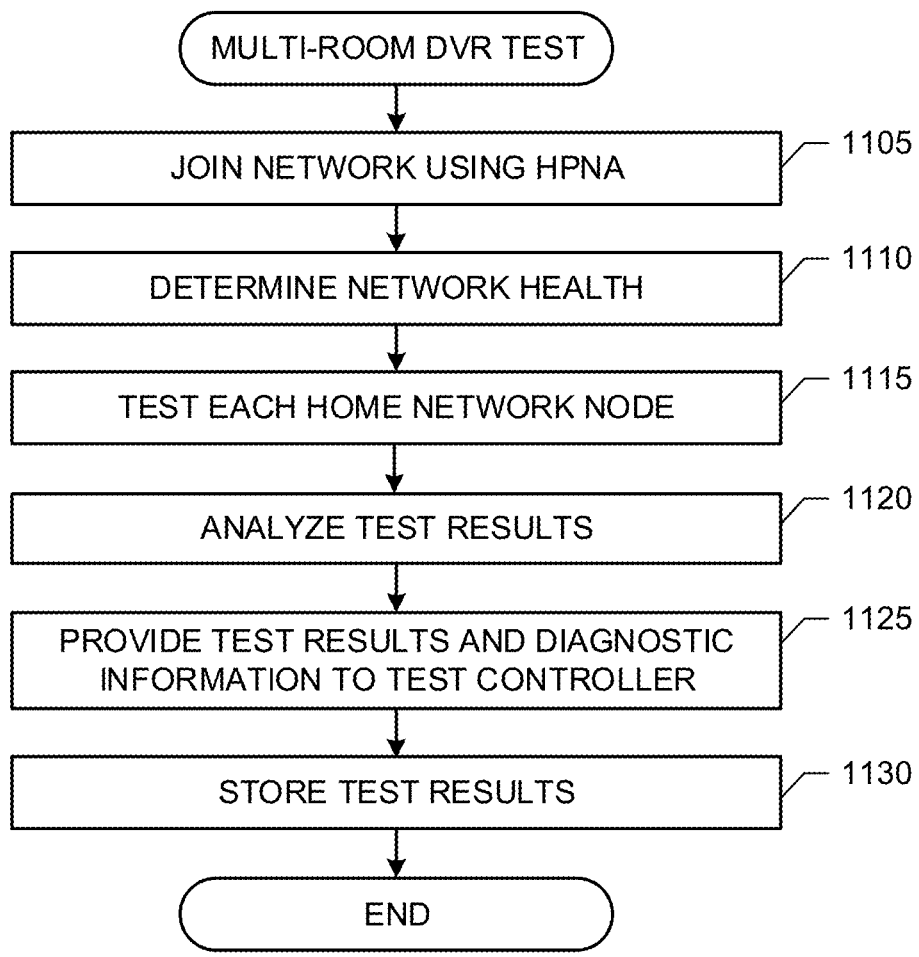

The example process of FIG. 11 may be carried out by the example home network test server 150 to perform a multi-room DVR test. The example process of FIG. 11 begins with the example HPNA transceiver 230 joining the HPNA network (block 1105). The example processor 212 via the HPNA transceiver 230 tests the HPNA network for network health (block 1110) and tests each HPNA node of the HPNA network for, for example, a configuration issue, throughput, errors and/or faults (block 1115). In some examples, the processor 212 processes the results of the tests to identify potential faults needing mediation by a user and/or technician (block 1120). The processor 212 provides the test results and/or identified potential faults to the home network test controller 190 via the Bluetooth transceiver 228 and/or the WLAN transceiver 235 (block 1125). In a remote test scenario, the test results and/or identified potential faults may be provided to the home network test controller 190 via the Ethernet transceiver 240. Depending on its configuration, the example processor 212 stores the test results and/or identified potential faults in the memory 218, the storage device(s) 222, on an inserted SD card and/or on an inserted USB device (block 1130). Control then exits from the example process of FIG. 11.

Figure 12:
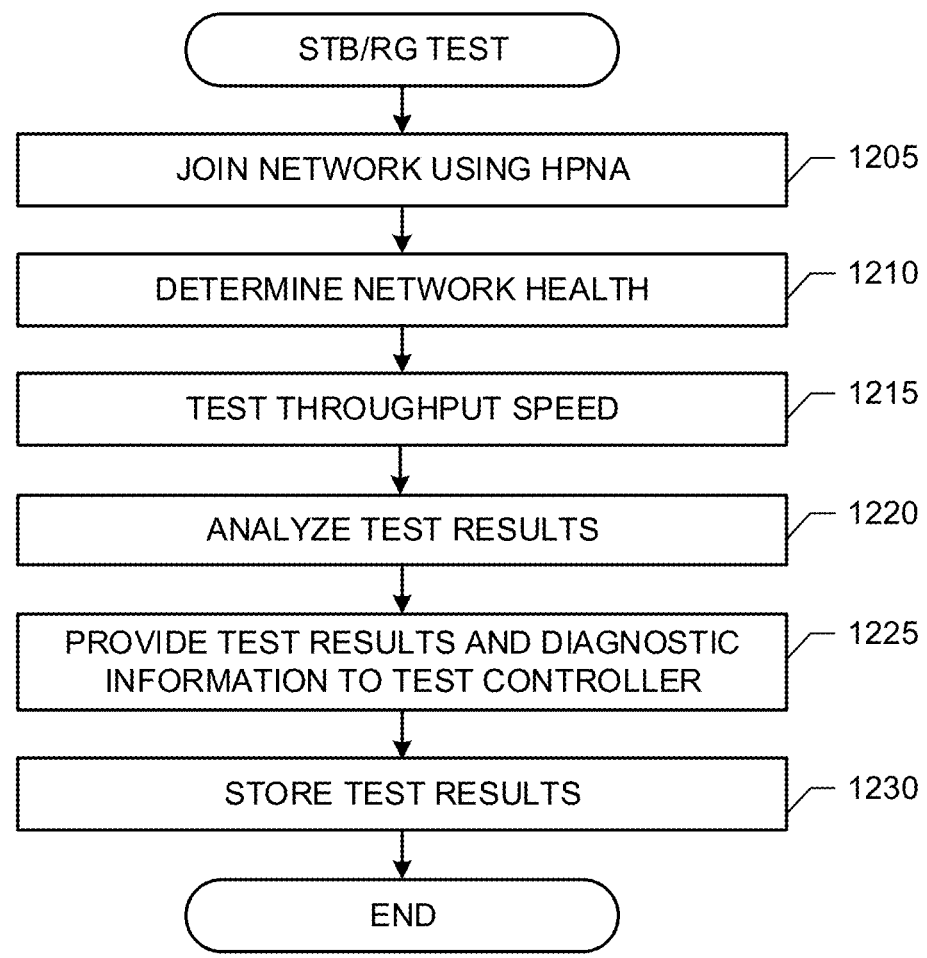

The example process of FIG. 12 may be carried out by the example home network test server 150 to perform a RG or STB test. The example process of FIG. 12 begins with the example HPNA transceiver 230 joining the HPNA network (block 1205). The example processor 212 via the HPNA transceiver 230 tests the HPNA network for network health (block 1210) and test the RG or STB to ensure its throughput exceeds a threshold (block 1215). In some example, the processor 212 processes the results of the tests to identify potential faults needing mediation by a user and/or technician (block 1220). The processor 212 provides the test results and/or identified potential faults to the home network test controller 190 via the Bluetooth transceiver 228 and/or the WLAN transceiver 235 (block 1225). In a remote test scenario, the test results and/or identified potential faults may be provided to the home network test controller 190 via the Ethernet transceiver 240. Depending on its configuration, the example processor 212 stores the test results and/or identified potential faults in the memory 218, the storage device(s) 222, on an inserted SD card and/or on an inserted USB device (block 1230). Control then exits from the example process of FIG. 12.

Figure 13:
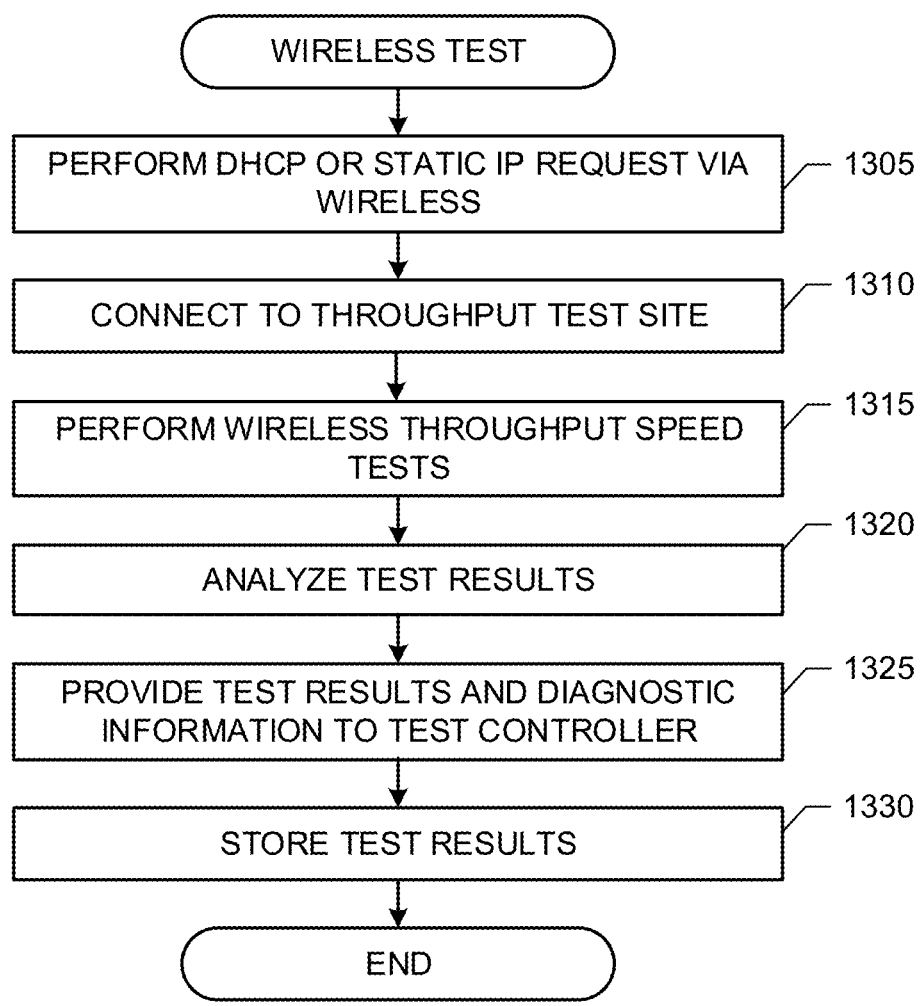

The example process of FIG. 13 may be carried out by the example home network test server 150 to test WLAN speed. The example process of FIG. 13 begins with the example WLAN transceiver 235 performing a domain host control protocol (DHCP) query or a static IP request to obtain an IP address (block 1305). The example processor 212 via the WLAN transceiver 235 connects to a service provider throughput test site or server (not shown) (block 1310) and performs upstream and downstream WLAN throughput tests (block 1315). In some example, the processor 212 processes the results of the tests to identify potential faults needing mediation by a user and/or technician (block 1320). The processor 212 provides the test results and/or identified potential faults to the home network test controller 190 via the Bluetooth transceiver 228 and/or the WLAN transceiver 235 (block 1325). In a remote test scenario, the test results and/or identified potential faults may be provided to the home network test controller 190 via the Ethernet transceiver 240. Depending on its configuration, the example processor 212 stores the test results and/or identified potential faults in the memory 218, the storage device(s) 222, on an inserted SD card and/or on an inserted USB device (block 1330). Control then exits from the example process of FIG. 13.

Figure 14:
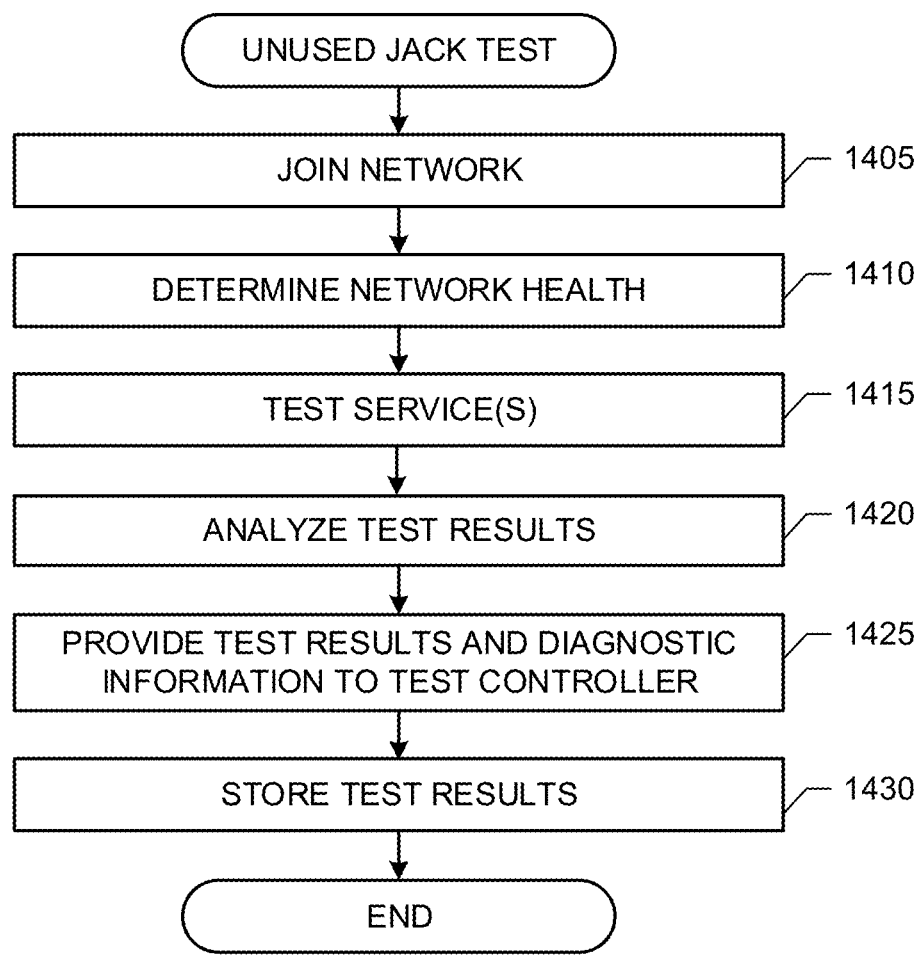

The example process of FIG. 14 may be carried out by the example home network test server 150 to perform a test of an unused jack 155, 160. The example process of FIG. 14 begins with the example HPNA transceiver 230 and/or the example Ethernet transceiver 240 joining the home network (block 1405). The example processor 212 via the transceiver 230, 240 tests the network for network health (block 1410) and tests whether the unused jack 155, 160 is capable to receive services configured in the home network (block 1415). In some examples, the processor 212 processes the results of the tests to identify potential faults needing mediation by a user and/or technician (block 1420). The processor 212 provides the test results and/or identified potential faults to the home network test controller 190 via the Bluetooth transceiver 228 and/or the WLAN transceiver 235 (block 1425). In a remote test scenario, the test results and/or identified potential faults may be provided to the home network test controller 190 via the Ethernet transceiver 240. Depending on its configuration, the example processor 212 stores the test results and/or identified potential faults in the memory 218, the storage device(s) 222, on an inserted SD card and/or on an inserted USB device (block 1430). Control then exits from the example process of FIG. 14.

Figure 15:
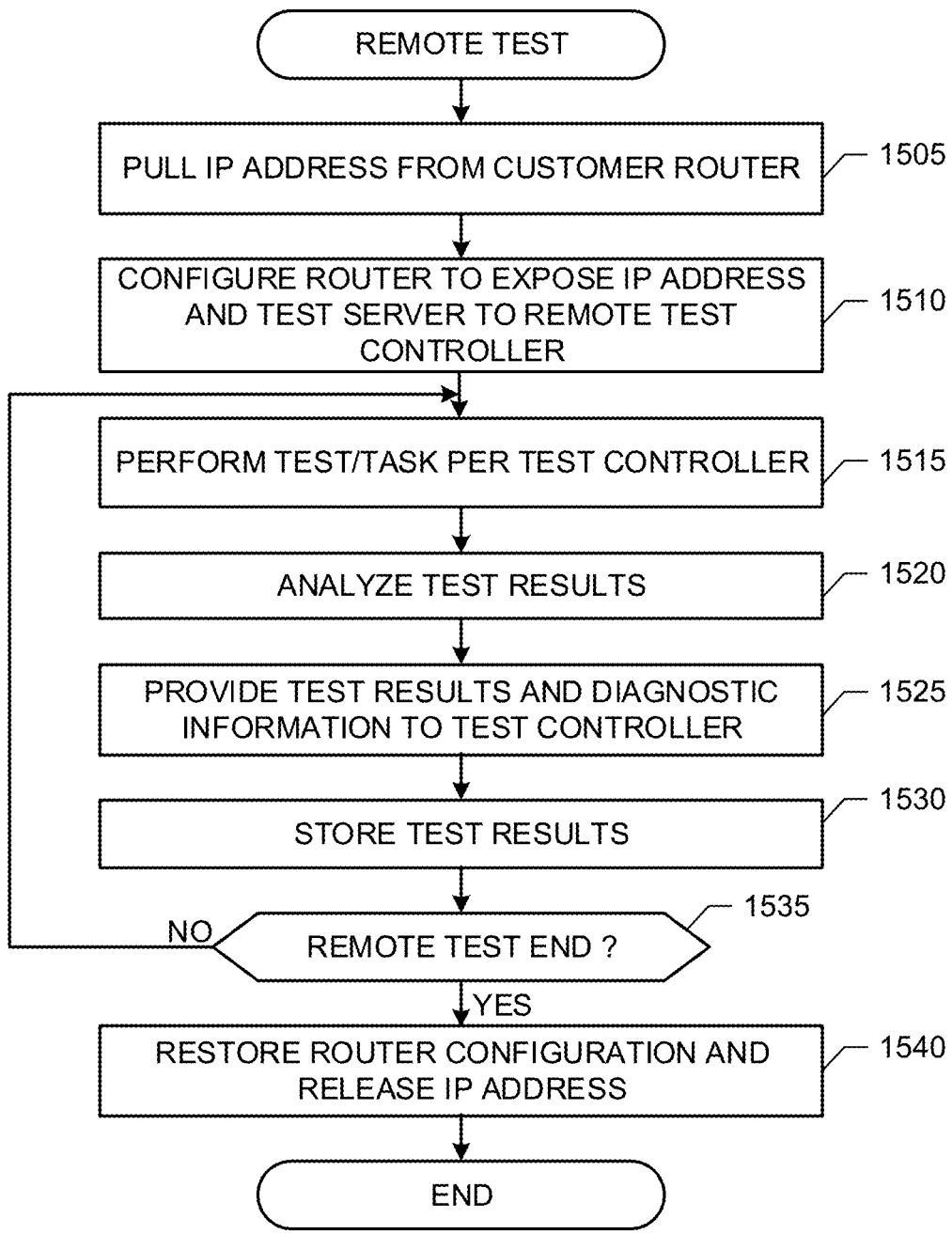

The example process of FIG. 15 may be carried out by the example home network test server 150 to perform a remote controlled test. The example process of FIG. 15 begins with the example HPNA transceiver 230 and/or the example Ethernet transceiver 240 obtaining an IP address from the RG 110 (block 1505). The example processor 212 reconfigures the RG 110 to expose the obtained IP address and enable access to the home network test server 150 from outside the home network (block 1510). As test commands are received from the remote home network test controller 190, the home network test server 150 performs the request test and/or configuration tasks (block 1515). In some examples, the processor 212 processes the results of the tests to identify potential faults needing mediation by a user and/or technician (block 1520). The processor 212 provides the test results and/or identified potential faults to the home network test controller 190 via the Bluetooth transceiver 228 and/or the WLAN transceiver 235 (block 1525). In a remote test scenario, the test results and/or identified potential faults may be provided to the home network test controller 190 via the Ethernet transceiver 240. Depending on its configuration, the example processor 212 stores the test results and/or identified potential faults in the memory 218, the storage device(s) 222, on an inserted SD card and/or on an inserted USB device (block 1530). When remote test mode is terminated (block 1535), the processor 212 restores the configuration of the RG 110 to hide the obtained IP address and block access to the home network test server 150 from outside the home network (block 1540). Control then exits from the example process of FIG. 15.

Figure 16:
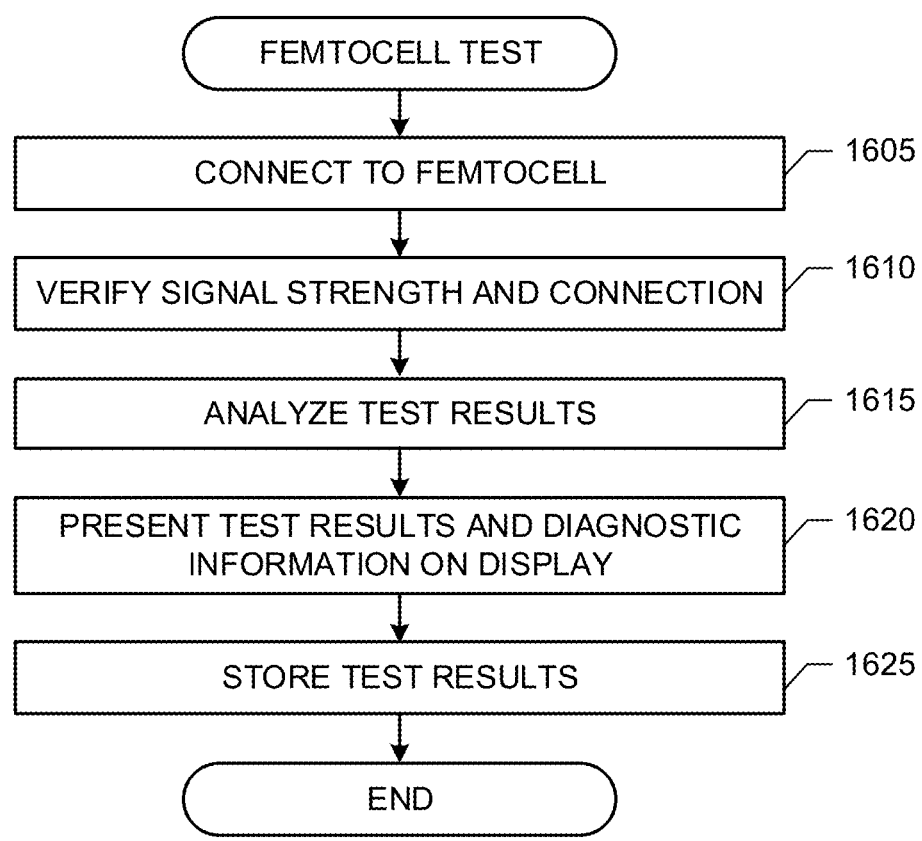
FIG. 16 is a flowchart representing an example process that may be embodied as machine-accessible instructions and executed by, for example, one or more processors to implement the example home network test controller of FIGS. 1 and 4.

FIG. 16 is a flowchart representing an example process that may be embodied as machine-accessible instructions and executed by, for example, the example home network test controller 190 to perform a femtocell test. A processor, a controller and/or any other suitable processing device may be used, configured and/or programmed to perform the example process of FIG. 16. For example, the process of FIG. 16 may be embodied in coded instructions stored on a tangible computer-readable medium. Alternatively, some or all of the example process of FIG. 16 may be implemented using any combination(s) of ASIC(s), PLD(s), FPLD(s), FPGA(s), fuses, discrete logic, hardware, firmware, etc. Also, some or all of the example process of FIG. 16 may be implemented manually or as any combination of any of the foregoing techniques, for example, any combination of firmware, software, discrete logic and/or hardware. Further, many other methods of implementing the example operations of FIG. 16 may be employed. For example, the order of execution of the blocks may be changed, and/or one or more of the blocks described may be changed, eliminated, sub-divided, or combined. Additionally, the blocks of any or all of the example process of FIG. 16 may be carried out sequentially and/or carried out in parallel by, for example, separate processing threads, processors, devices, discrete logic, circuits, etc.

The example process of FIG. 16 may be carried out by the example home network test server 160 to perform a remote controlled test. The example process of FIG. 16 begins with the example cellular transceiver 440 (FIG. 4) connecting to the example femtocell 160 (block 1605). The example processor 412 obtains from the example cellular transceiver 440 information regarding the connection (e.g., signal strength, connection speed, etc.) with the femtocell 160 (block 1610) In some examples, the processor 212 processes the results of the tests to identify potential faults needing mediation by a user and/or technician (block 1615). The processor 412 presents the test results and/or identified potential faults via the example display module 445 and display 446 of the home network test controller 190 (block 1620). Depending on its configuration, the example processor 412 stores the test results and/or identified potential faults in the memory 418, the storage device(s) 422 (block 1625). Control then exits from the example process of FIG. 16.

FIG. 17 illustrates an example GUI that may be presented by the example home network test controller 190 to enable a user to initiate one or more tests of a home network. The example GUI of FIG. 17 includes a plurality of selectable screen elements 1705 that may be activated to initiate a corresponding test. For example, the selectable element 1710 initiates an HPNA test such as the example HPNA test illustrated in FIG. 8.

FIGS. 18-22 illustrates example GUIs that may be displayed by the example home network test controller 190 to present test results, home network status, home network connectivity, home network performance and/or identified potential home network faults.

Figure 23:
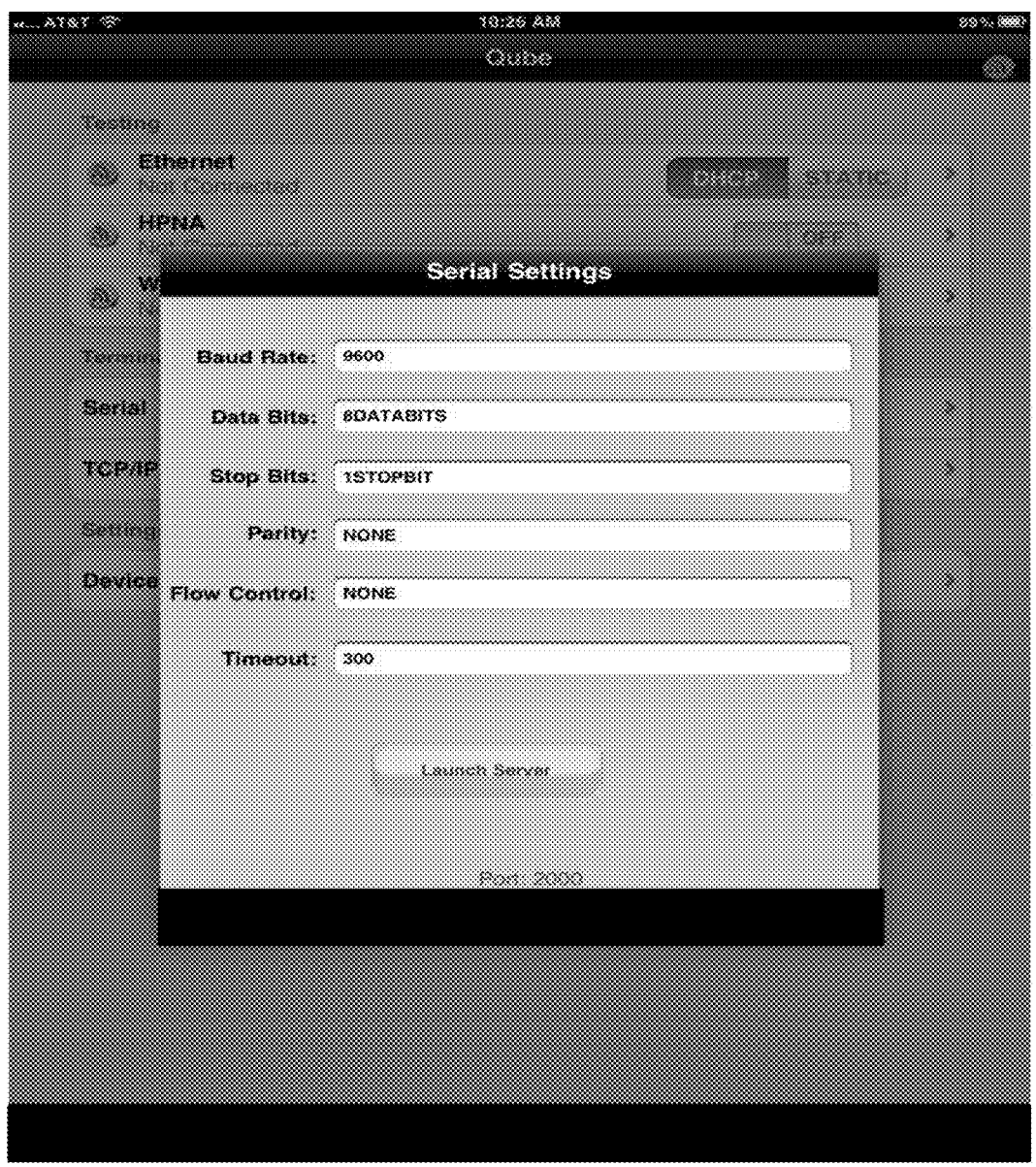

Returning to FIG. 17, the example GUI also includes a selectable element 1715 to configure a serial connection (e.g., RS-232) between the home network test server 150 and an external peripheral test device. Activation of the example GUI element 1715 causes the home network test controller 190 to present the example GUI of FIG. 23 to allow a user to configured serial communication parameters.

Returning to FIG. 17, the example GUI includes another selectable element 1720 to initiate a TCP/IP test such as ping, trace route, etc. Activation of the example GUI element 1720 causes the home network test controller 190 to present another GUI to enable a user to select and/or initiate specific TCP/IP tests.

The example GUI of FIG. 17 includes another selectable element 1725 to enable the user to configure the home network test controller 190. Activation of the example GUI element 1720 causes the home network test controller 190 to present yet another GUI to enable a user to configure the example home network test controller 190.

Figure 24:
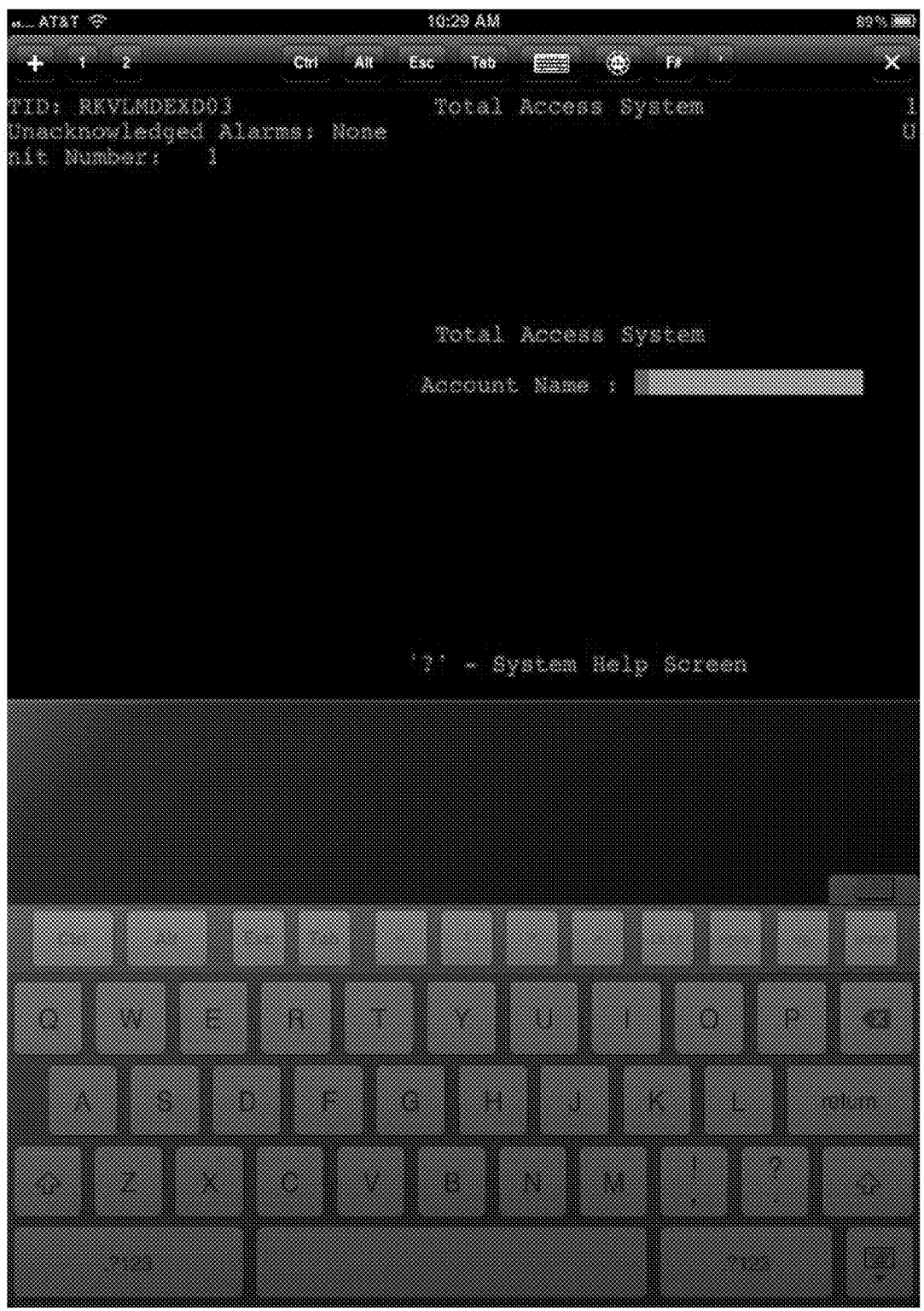
Figure 25:
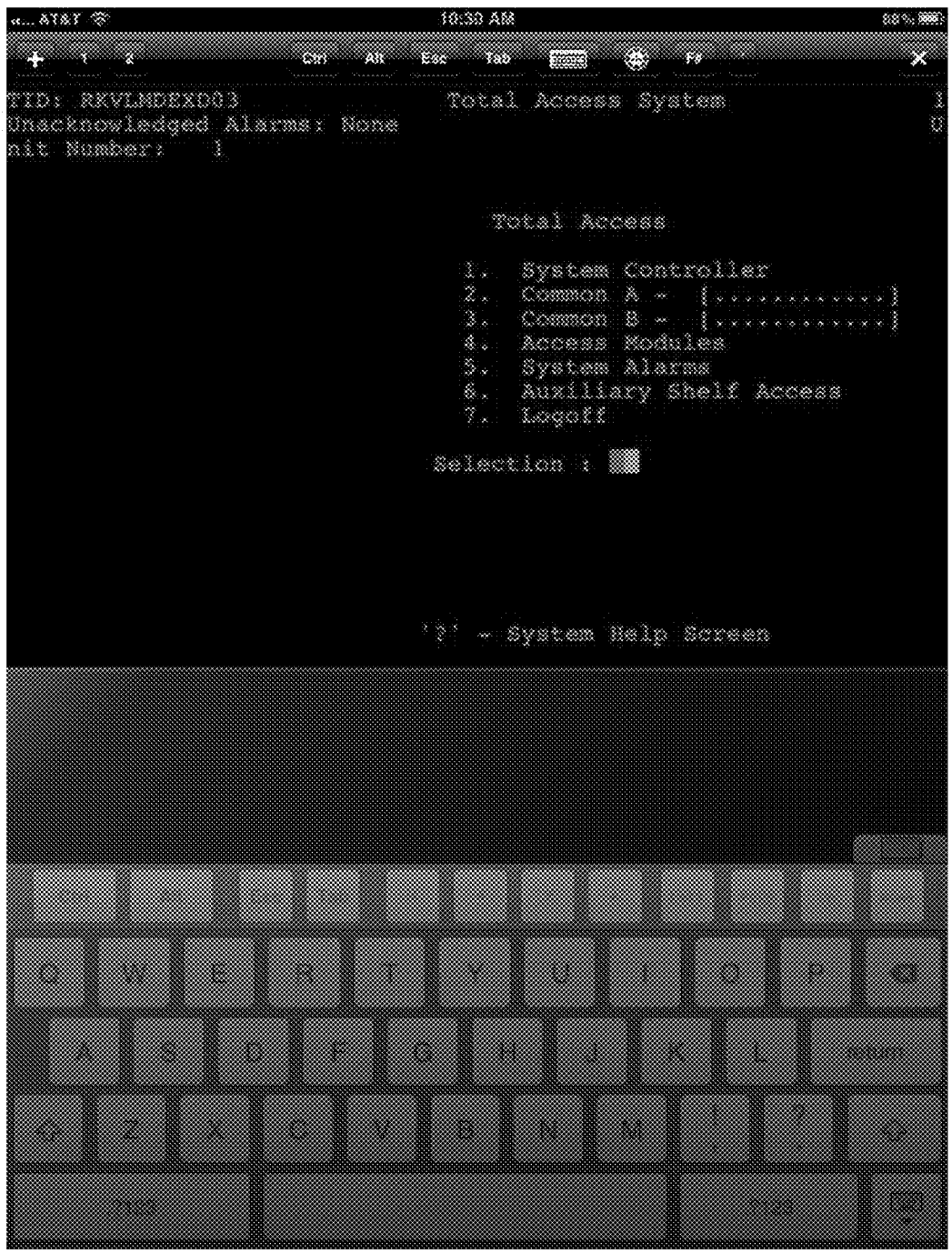
Figure 26:
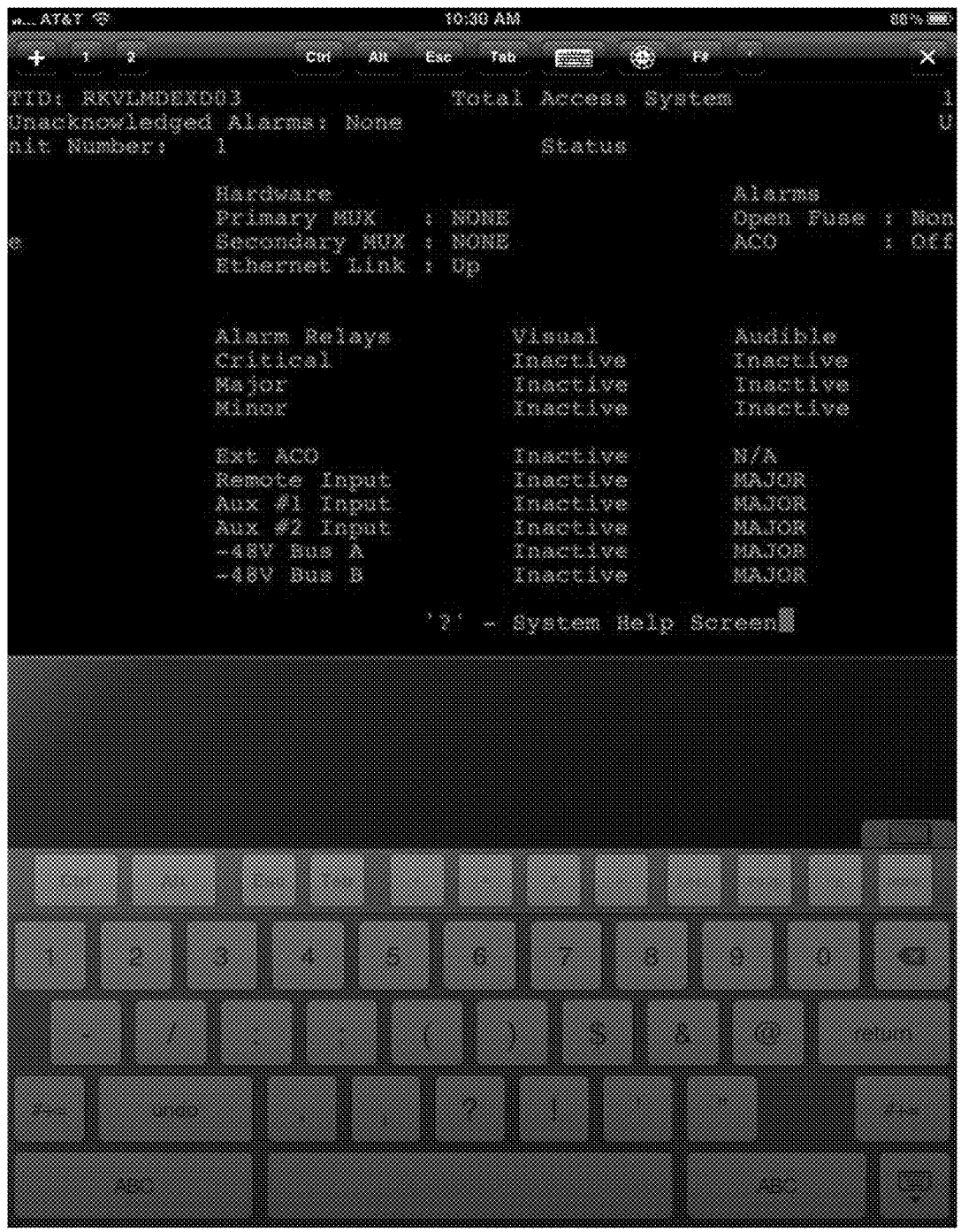

FIGS. 24-26 present example terminal interface screens depicting use of the example home network test controller 190 to interact with, control and/or configure traditional or legacy backend testing systems such as LSBBT and SCANR and/or non home network equipment and/or devices such as a fiber optic multiplexor.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:
1. A method comprising:
   instructing, from a test controller, a test server to communicate with a residential gateway of a home network of a customer premises, both the test controller and the test server located within the customer premises, the test server separate from the residential gateway, the test controller separate from the residential gateway;
   instructing, from the test controller, the test server to perform a first test of the home network;
   performing, a second test of a direct cellular connection between a cellular transceiver of the test controller and a cellular transceiver of a femtocell, the second test including a cellular communication test, the second test different from the first test, the second test not involving the test server, the femtocell communicatively coupled to the residential gateway, the femtocell separate from the residential gateway, the femtocell to communicate with customer premises equipment via a cellular transceiver of the customer premises equipment to enable the customer premises equipment to access a cellular service provider's network through the residential gateway; and
   presenting, via a display of the test controller, a first result of the first test and a second result of the second test.

2. The method as defined in claim 1, wherein the residential gateway communicatively couples the femtocell to an external network.

3. The method as defined in claim 1, further including identifying, with the test controller, a problem in the home network based on at least one of the first result or the second result.

4. The method as defined in claim 1, wherein the test controller includes a processor within at least one of a mobile handheld device, a tablet computer, or a smartphone.

5. The method as defined in claim 1, further including storing a second result of the second test on at least one of a non-volatile storage device or a universal serial bus device.

6. The method as defined in claim 2, wherein the second test is performed without communicating via the residential gateway.

7. The method as defined in claim 1, wherein instructing the test server to perform the first test is performed using a first communication protocol and the second test is performed using a second communication protocol different from the first communication protocol.

8. The method as defined in claim 7, wherein the first communication protocol is a Bluetooth communication protocol and the second communication protocol is a cellular communication protocol.

9. The method as defined in claim 1, wherein the first test is at least one of a bandwidth test, a video quality test, a multi-room digital video recorder test, a set top box test, a wireless test, or an unused jack test, and the second test is a femtocell test.

10. The method of claim 1, wherein the second test is to assess at least one of a signal strength or a connection speed between the test controller and the femtocell, the second test performed at a first location within the customer premises, and further including:
performing with the cellular transceiver of the test controller, a third test of the femtocell at a second location within the customer premises different from the first location, the third test not involving the test server.

11. A test controller comprising:
a processor;
a display;
a first communication interface;
a second communication interface; and
a memory including machine readable instructions that, when executed by the processor, cause the processor to perform operations including:
instructing a test server to communicate with a residential gateway of a home network of a customer premises, the test server separate from the residential gateway, the test controller separate from the residential gateway;
instructing the test server to perform a first test of the home network, the instructing performed using the first communication interface;
performing a second test of a direct cellular connection between a cellular transceiver of the test controller and a cellular transceiver of a femtocell, the second test including a cellular communication test, the second test different from the first test, the second test not involving the test server, both the test controller and the test server located within the customer premises, the femtocell in communication with the residential gateway, the femtocell separate from the residential gateway, the femtocell to communicate with customer premises equipment via a cellular transceiver of the customer premises equipment to enable the customer premises equipment to communicate with a cellular service provider's network through the residential gateway; and
presenting, via the display of the test controller, a first result of the first test and a second result of the second test.

12. The test controller as defined in claim 11, wherein the residential gateway communicatively couples the femtocell to an external network.

13. The test controller as defined in claim 11, wherein the operations further include identifying a potential problem in the home network based on at least one of the first result or the second result.

14. The test controller as defined in claim 11, wherein the first communication interface includes at least one of a Bluetooth transceiver or a wireless local area network transceiver.

15. The test controller as defined in claim 11, wherein the first test is performed using a home phoneline networking alliance transceiver and an F-connector.

16. The test controller as defined in claim 11, further including a wireless local area network transceiver.

17. A computer-readable storage device including instructions which, when executed by a test controller, cause the test controller to perform operations comprising:
instructing a test server to communicate with a residential gateway of a home network of a customer premises, the test server separate from the residential gateway, the test controller separate from the residential gateway;
instructing the test server to perform a first test of the home network;
performing a second test of a direct cellular connection between a cellular transceiver of the test controller and a cellular transceiver of a femtocell, the second test including a cellular communication test, the second test different from the first test, the second test not involving the test server, both the test controller and the test server located within the customer premises, the femtocell to communicate with the residential gateway, the femtocell separate from the residential gateway, the femtocell to communicate with customer premises equipment via a cellular transceiver of the customer premises equipment to connect the customer premises equipment to a cellular service provider's network through the residential gateway; and
presenting, via a display of the test controller, a first result of the first test and a second result of the second test.

18. The computer-readable storage device as defined in claim 17, wherein the operations further include identifying a potential problem in the home network based on at least one of the first result or the second result.

19. The computer-readable storage device as defined in claim 17, wherein the second test is performed without communicating via the residential gateway.

* * * * *